US010364757B2

(12) United States Patent
Leone et al.

(10) Patent No.: US 10,364,757 B2
(45) Date of Patent: Jul. 30, 2019

(54) SYSTEMS AND METHODS FOR CONTROL OF TURBINE-GENERATOR IN A SPLIT EXHAUST ENGINE SYSTEM

(71) Applicant: Ford Global Technologies, LLC, Dearborn, MI (US)

(72) Inventors: Thomas G. Leone, Ypsilanti, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 540 days.

(21) Appl. No.: 15/145,686

(22) Filed: May 3, 2016

(65) Prior Publication Data

US 2017/0321614 A1    Nov. 9, 2017

(51) Int. Cl.
*F02D 13/02* (2006.01)
*F02D 31/00* (2006.01)
*F02D 35/00* (2006.01)
*F02D 41/00* (2006.01)
*F02D 41/02* (2006.01)
*F02D 17/02* (2006.01)
*F01N 3/18* (2006.01)
(Continued)

(52) U.S. Cl.
CPC ........... *F02D 13/0249* (2013.01); *F01N 3/18* (2013.01); *F01N 5/04* (2013.01); *F01N 13/10* (2013.01); *F01N 13/107* (2013.01); *F02D 13/0257* (2013.01); *F02D 17/02* (2013.01); *F02D 31/001* (2013.01); *F02D 35/0015* (2013.01); *F02D 41/021* (2013.01); *F02D 13/0242* (2013.01); *F02D 41/008* (2013.01); *F02D 2041/001* (2013.01); *Y02T 10/16* (2013.01); *Y02T 10/18* (2013.01)

(58) Field of Classification Search
CPC .. F02D 13/02; F02D 13/0203; F02D 13/0207; F02D 13/0211; F02D 13/0215; F02D 13/0219; F02D 13/0242; F02D 13/0246; F02D 13/0249; F02D 31/001; F02D 35/0015; F01N 3/18; F01N 3/10; F01N 3/107; F01N 5/04
See application file for complete search history.

(56) References Cited

U.S. PATENT DOCUMENTS

| | | | |
|---|---|---|---|
| 6,460,337 | B1 | 10/2002 | Olofsson |
| 8,091,357 | B2 | 1/2012 | Robel |

(Continued)

FOREIGN PATENT DOCUMENTS

| | | | |
|---|---|---|---|
| EP | 1127218 | B1 | 2/2004 |
| EP | 2749757 | A1 | 7/2014 |

(Continued)

*Primary Examiner* — Jason D Shanske
*Assistant Examiner* — Jessica L Kebea
(74) *Attorney, Agent, or Firm* — Julia Voutyras; McCoy Russell LLP

(57) ABSTRACT

Methods and systems are provided to control exhaust energy delivered to a turbine of a turbine-generator coupled to a split exhaust engine system in order to limit turbine over-speed conditions and/or reduce generator vibration or reduce component over-heating conditions. In one example, a method may comprise in response to turbine speed greater than a threshold speed, selectively deactivating a first exhaust valve of one or more cylinders of a first and second cylinder group.

18 Claims, 9 Drawing Sheets

(51) Int. Cl.
  *F01N 5/04*   (2006.01)
  *F01N 13/10*  (2010.01)

(56) References Cited

U.S. PATENT DOCUMENTS

| | | | |
|---|---|---|---|
| 8,359,770 B2 | 1/2013 | Frederick | |
| 8,763,385 B2 | 7/2014 | Leone et al. | |
| 8,967,116 B2 | 3/2015 | Leone et al. | |
| 9,051,871 B1* | 6/2015 | Wu | F02D 41/0087 |
| 9,399,969 B2* | 7/2016 | Boyer | F02M 26/04 |
| 9,518,506 B2* | 12/2016 | Leone | F02B 37/004 |
| 9,624,850 B2* | 4/2017 | Ulrey | F01N 5/04 |
| 2003/0000211 A1* | 1/2003 | Drangel | F01D 17/143 60/602 |
| 2008/0282699 A1* | 11/2008 | Barthelet | F02B 37/04 60/608 |
| 2012/0096856 A1* | 4/2012 | Rutschmann | F01N 13/107 60/612 |
| 2013/0092125 A1 | 4/2013 | Leone et al. | |
| 2013/0269315 A1* | 10/2013 | Ervin | F02D 41/0245 60/273 |
| 2014/0249732 A1 | 9/2014 | Leone et al. | |
| 2014/0356153 A1 | 12/2014 | Hoshi et al. | |
| 2016/0131016 A1 | 5/2016 | Mehravaran et al. | |
| 2016/0131021 A1* | 5/2016 | Baker | F02B 33/34 60/605.1 |
| 2016/0131046 A1 | 5/2016 | Leone et al. | |
| 2016/0131054 A1 | 5/2016 | Ulrey et al. | |
| 2018/0216540 A1* | 8/2018 | Dupuis | F02D 41/024 |
| 2018/0371992 A1* | 12/2018 | Mehta | F01N 13/107 |

FOREIGN PATENT DOCUMENTS

| | | | | |
|---|---|---|---|---|
| JP | WO 2009040642 A1 * | 4/2009 | | F01N 13/107 |
| WO | 2014102236 A1 | 7/2014 | | |

* cited by examiner

SYSTEMS AND METHODS FOR CONTROL OF TURBINE-GENERATOR IN A SPLIT EXHAUST ENGINE SYSTEM

FIELD

The present description relates generally to methods and systems for controlling a vehicle engine including a split exhaust manifold to adjust a turbine-generator.

BACKGROUND/SUMMARY

Engine systems may be configured with a split exhaust manifold wherein exhaust from some cylinders is directed to the exhaust passage via a first exhaust manifold and cylinder exhaust from different cylinders are directed to a common tailpipe via distinct exhaust passages.

One example of a split exhaust engine system is shown by Olofsson in EP 1127218 B1. Therein a multi-cylinder system with an exhaust driven turbine is used to power a compressor. The split exhaust system connects a first exhaust valve from each cylinder through a first exhaust branch to the turbine, while a second exhaust valve from each cylinder bypasses the turbine and directly connects to a second exhaust branch leading to an exhaust catalyst, located downstream from the turbine. Adjustments in valve timing can be used to control flow of air into the engine via intake valves and control flow of exhaust energy via the first exhaust valve to the turbine and via the second exhaust valve to the exhaust catalyst in response to changes in engine speed.

In still other engine systems with a split exhaust manifold, a first exhaust valve of a cylinder may be opened earlier in an engine cycle to deliver exhaust mass flow from an initial portion of an exhaust phase to a turbine, while a second exhaust valve may be opened later in the engine cycle to deliver exhaust mass flow from a latter portion of the exhaust phase directly to an exhaust catalyst, bypassing the turbine. In this way, by directing exhaust gases away from the turbine during the latter portion of the exhaust phase, the pumping penalty associated with high turbine backpressure may be reduced.

However, the inventors herein have recognized potential issues with such split exhaust systems. One shortcoming may be reduced engine efficiency due to significant energy losses in engine exhaust manifolds. As an example, a significant fraction of the exhaust energy delivered to the turbine may be lost due to an extensive network of exhaust manifolds between the exhaust valves and the turbine, and may lead to reduced engine efficiency.

Another shortcoming recognized in split exhaust systems may be reduced capability to control turbine speed, generator noise, vibration and harshness (NVH), or over-temperature of components such as cylinder head, exhaust valves, exhaust manifold, turbine, catalyst, etc. As a result, during engine operation turbine speed may increase above threshold levels which when left unchecked may lead to suboptimal performance of the system.

Thus in one example, some of these issues may be at least partly addressed by a method for an engine, comprising: delivering exhaust from a first exhaust valve of all cylinders of a first cylinder group to a first scroll of an exhaust turbine while delivering exhaust from a first exhaust valve of all cylinders of a second cylinder group to a second scroll of the exhaust turbine; and delivering exhaust from a second exhaust valve of all cylinders of the first and second cylinder group to an exhaust catalyst, while bypassing the turbine. The method may further comprise, in response to turbine speed greater than a threshold speed, selectively deactivating the first exhaust valve of one or more cylinders of the first and second cylinder group. In this way, by grouping cylinders, the exhaust manifold volume between an individual cylinder and the turbine can be reduced, allowing for efficient delivery of exhaust energy to the turbine and minimizing energy losses. By selectively deactivating the first exhaust valve of one or more cylinders of the first and second cylinder group, an amount of exhaust mass flow to the turbine may be reduced and turbine speed may be controlled to modulate generator output and/or to avoid turbine or generator failure and/or to reduce generator NVH and/or to improve engine efficiency.

As one example, an engine may include a plurality of cylinders organized into a first and a second cylinder group. Responsive to a turbine speed greater than a threshold turbine speed, one or more cylinders may be selectively deactivated. For example, the first exhaust valve of one cylinder of the first cylinder group and one cylinder of the second cylinder group may be selectively deactivated for a specified duration. The selective deactivation of the first exhaust valve limits exhaust flow to the turbine, reducing turbine speed and reducing generator output and reducing generator NVH to threshold levels. The one cylinder of the first and the second cylinder group may be selected based on their position on the engine block and/or their firing order so that while reducing the turbine speed, NVH issues are reduced. In other examples, as the turbine speed exceeds the threshold turbine speed, a larger number of cylinders of the first and/or second cylinder group may be selected and their corresponding first exhaust valves may be selectively deactivated until the turbine speed is within a desired range.

The approach described here may confer several advantages. For example, the method provides improved capability for delivering exhaust energy from engine cylinders to the turbine. Consequently, the approach reduces energy losses in the engine exhaust manifold. Furthermore, the approach allows control of turbine speed over a wide range of engine operating conditions. By controlling and limiting turbine speed (and therefore generator speed) to a desired speed (or speed range), elevation in generator output and generator NVH and rise in component temperature may be limited to desired threshold levels, improving engine efficiency. In addition, adapting an exhaust system with a smaller network of exhaust manifolds between the cylinder and the turbine limits energy losses in the exhaust system and ensures improved generator output and therefore improved overall engine/generator efficiency and performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
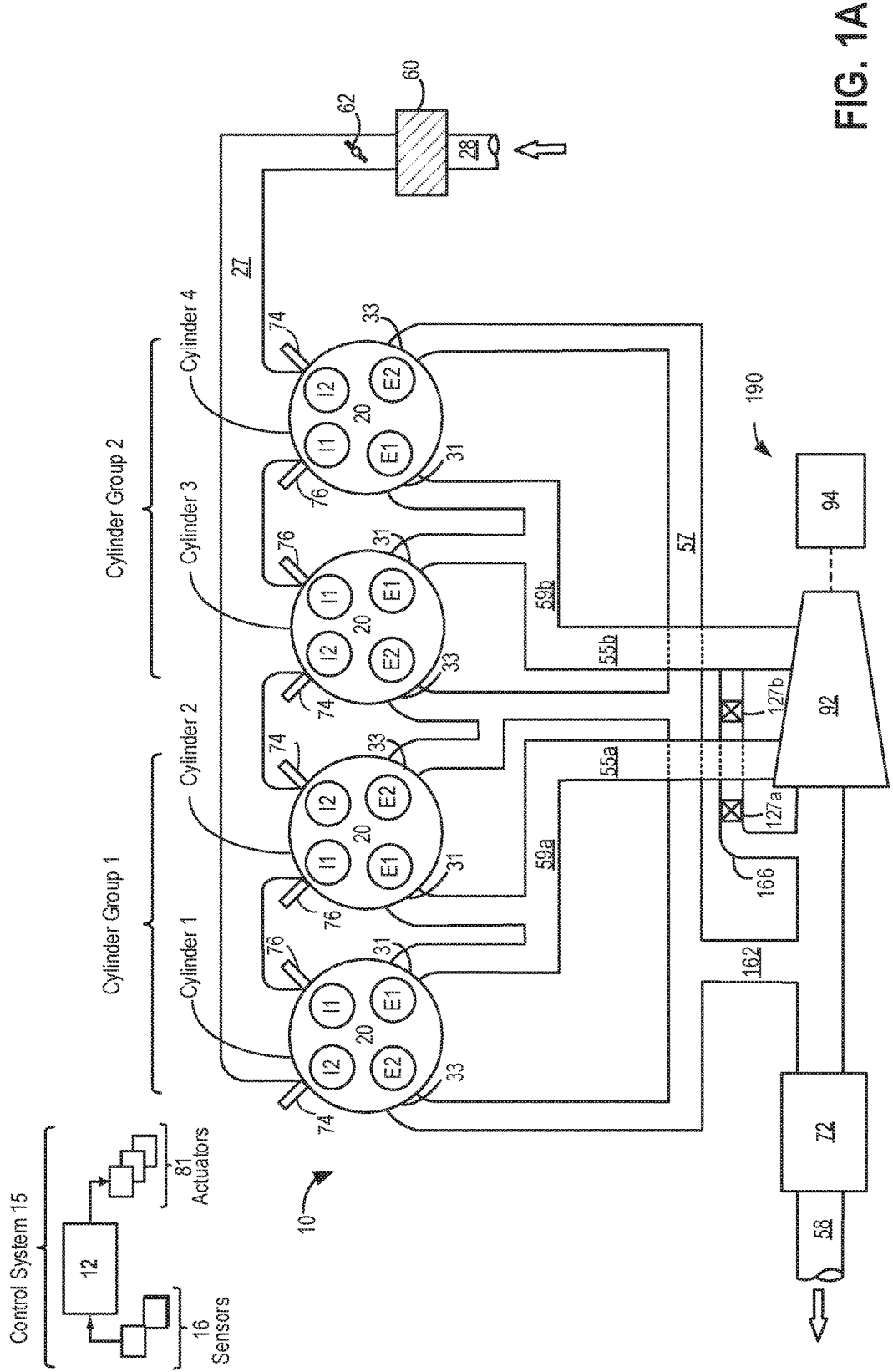
FIG. 1A shows a schematic depiction of a naturally aspirated engine system with a split exhaust manifold and a twin scroll turbine driving a generator.
Figure 1B:
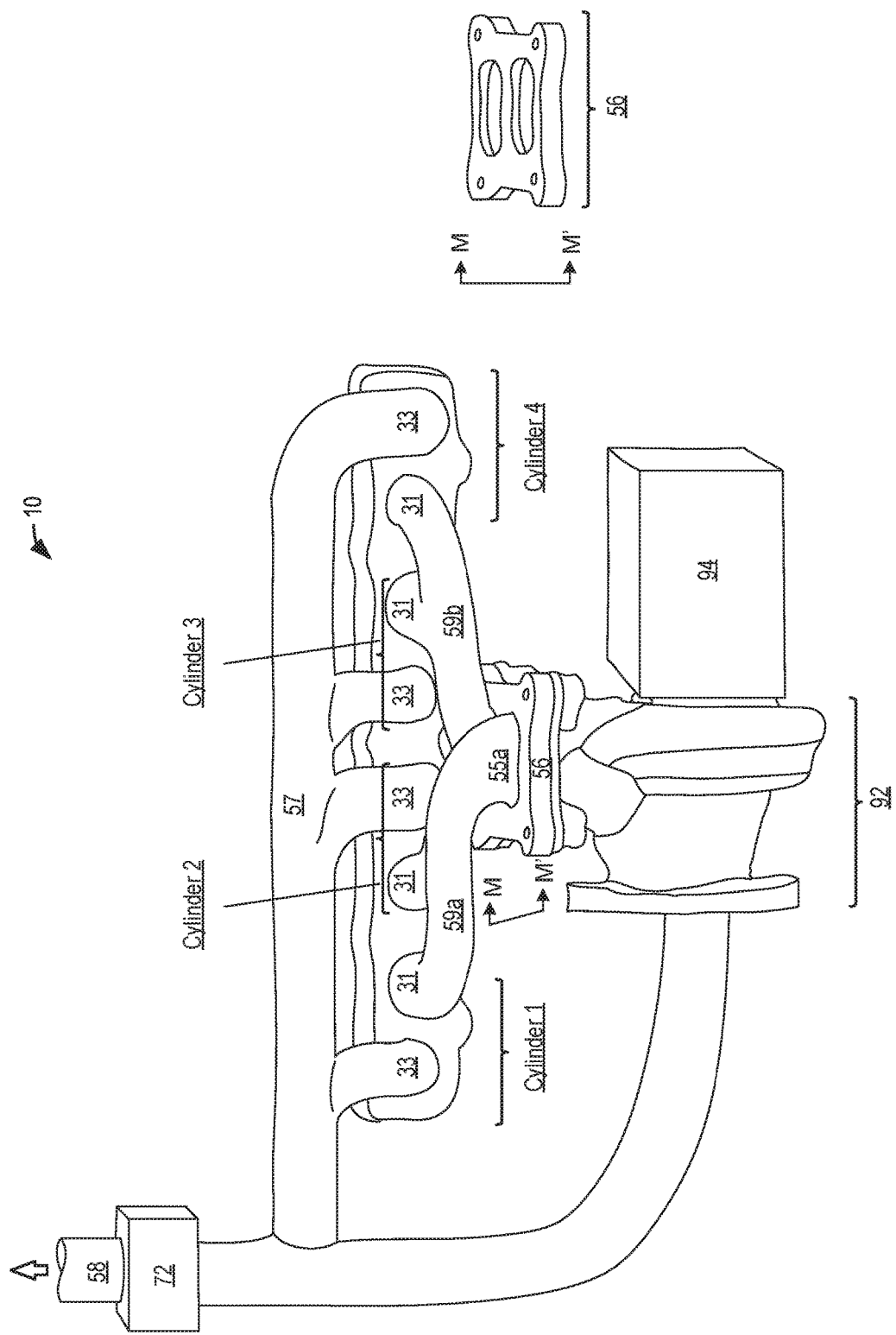
FIG. 1B shows a schematic depiction of a naturally aspirated engine system with a split exhaust manifold connecting to a twin scroll turbine (driving a generator) and an exhaust catalyst.
Figure 2:
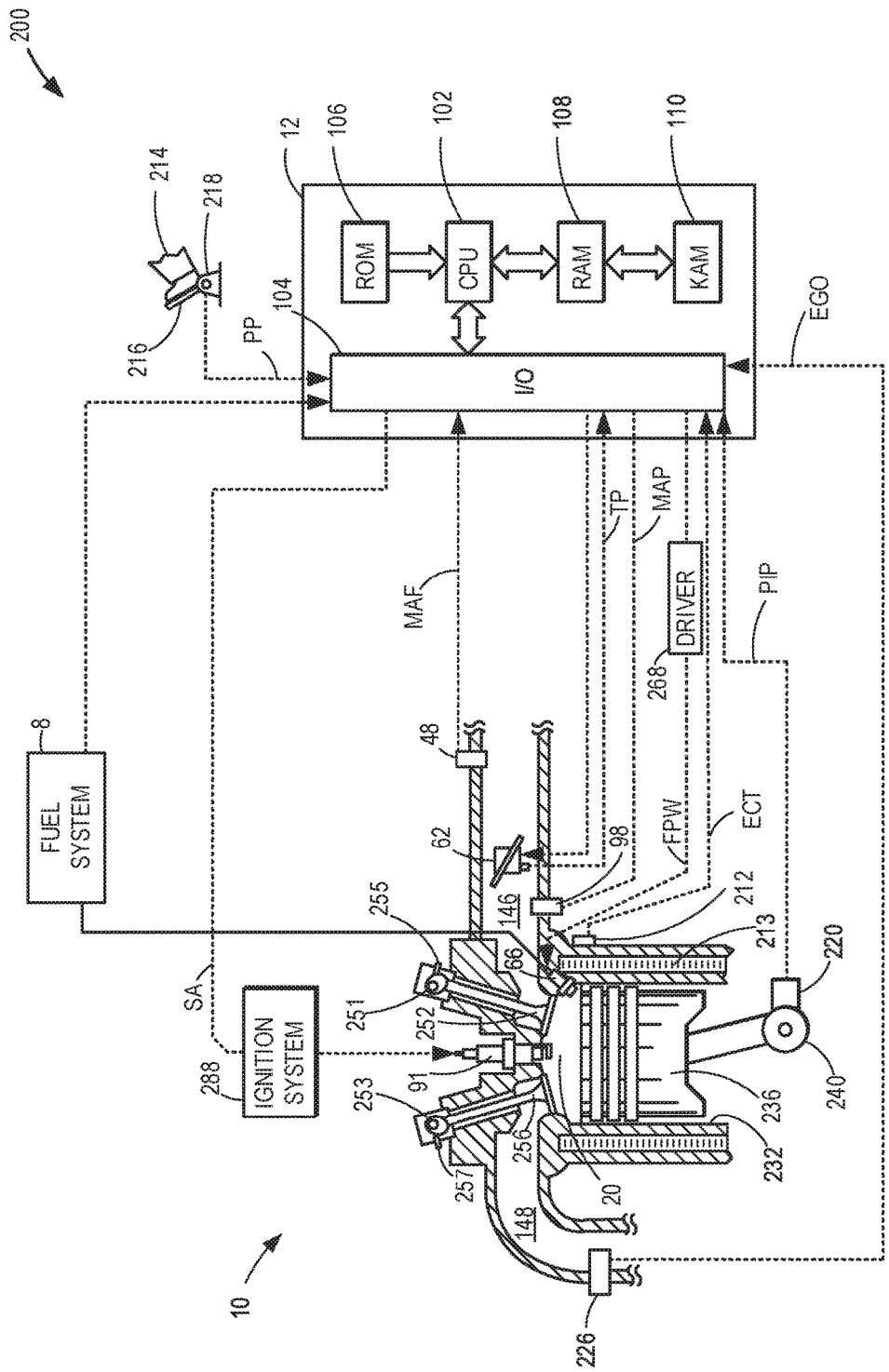
FIG. 2 shows a schematic depiction of a combustion chamber of the engine system of FIG. 1A.
Figure 6:
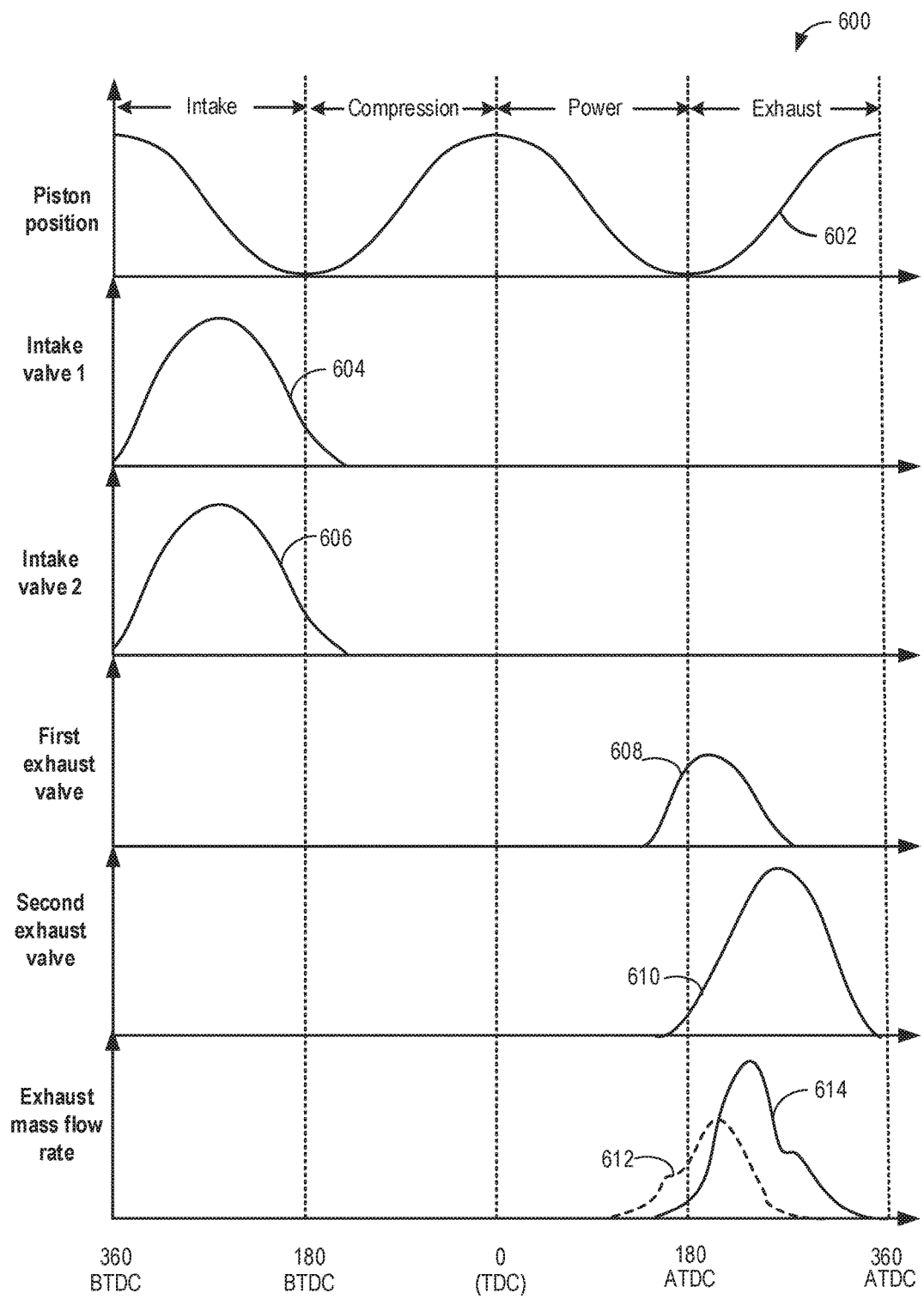
FIG. 6 shows an example intake and exhaust valve timing and duration during nominal engine operation, according to the present disclosure.
Figure 7:
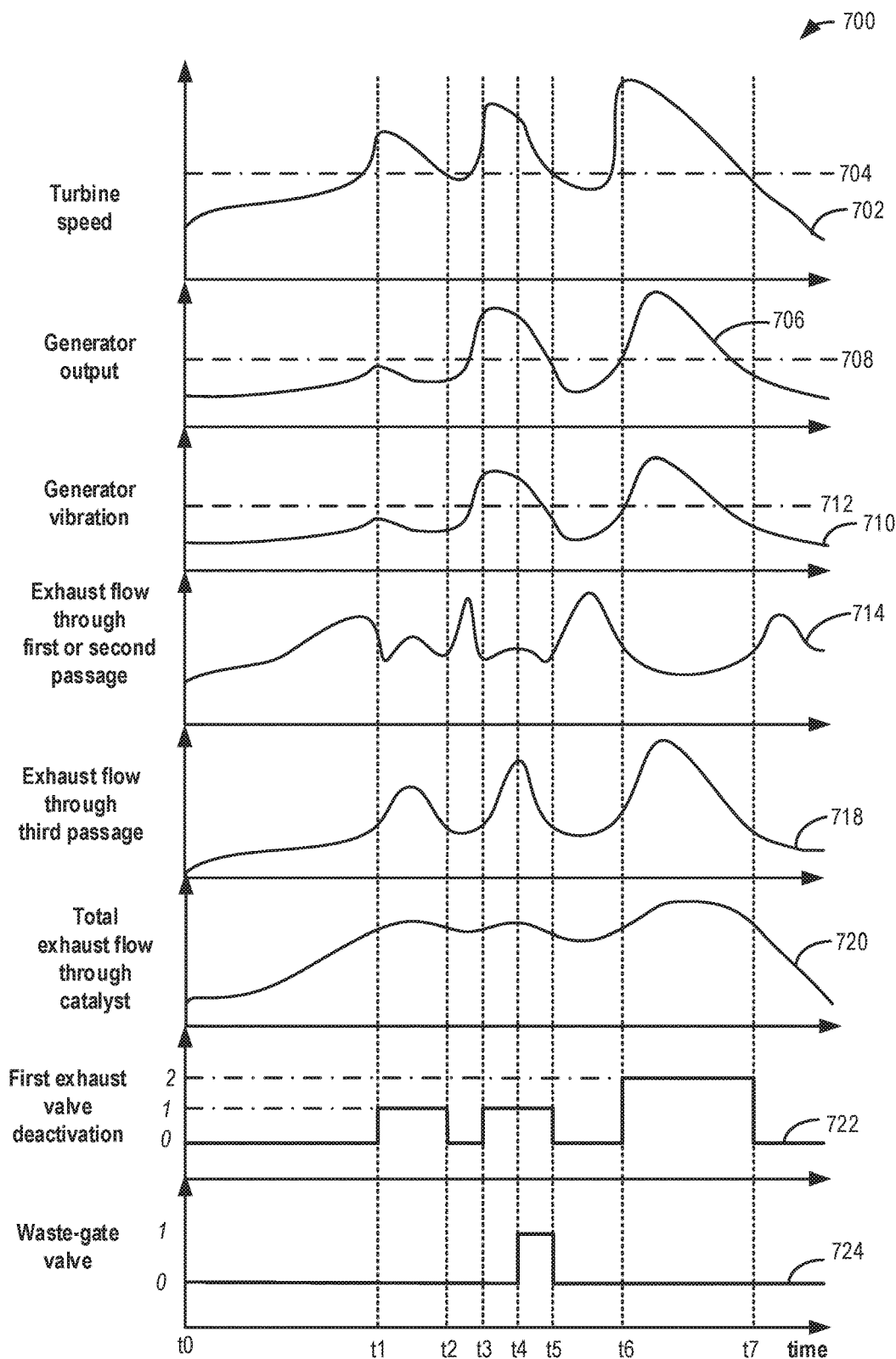
FIG. 7 shows an example map depicting selective valve deactivation in cylinders of multiple cylinder groups based on turbine speed, generator power or current output and/or generator NVH.
Figure 8:
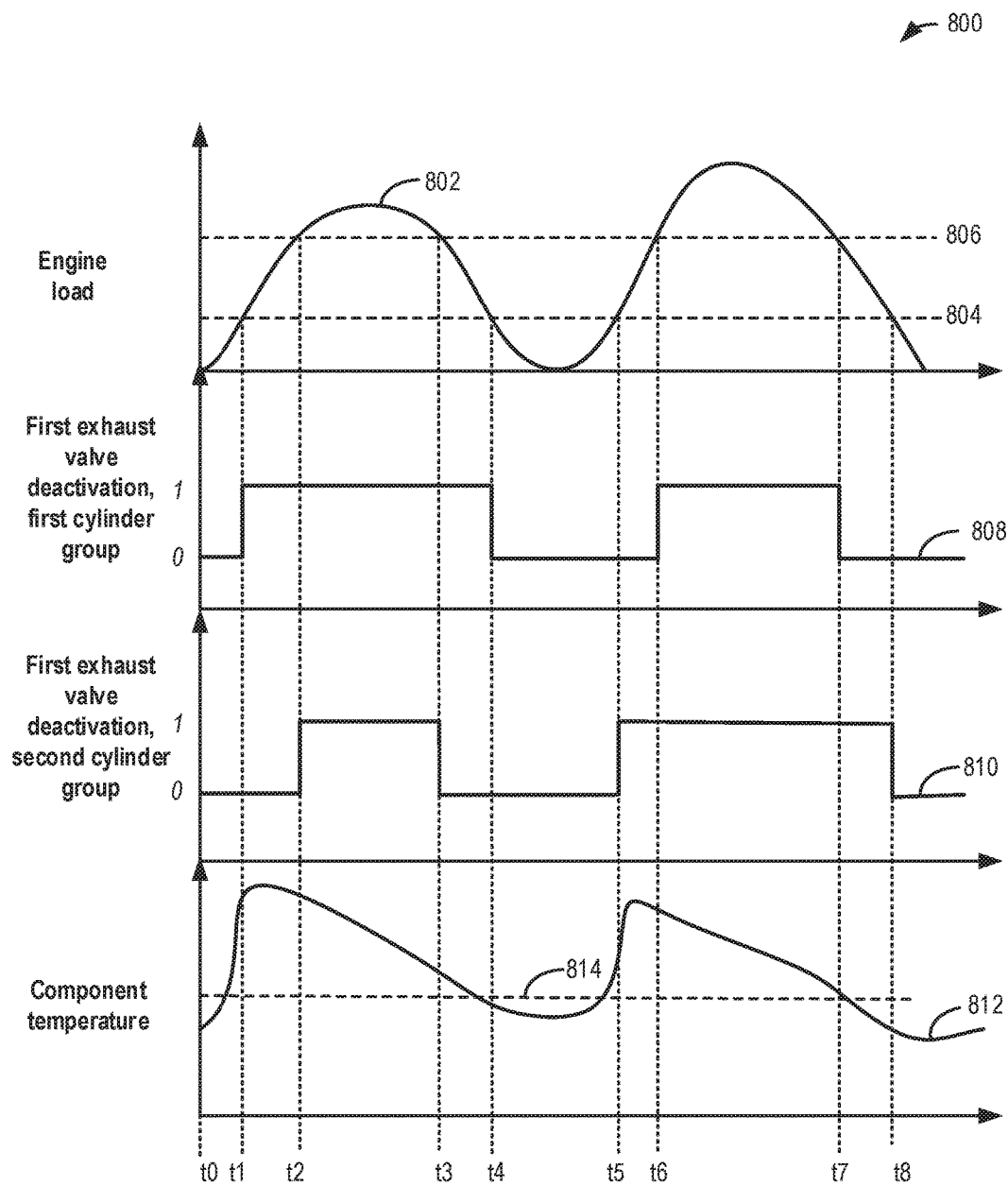
FIG. 8 shows an example map depicting selective valve deactivation in cylinders of multiple cylinder groups based on engine load and/or component temperature.

The following description relates to systems and methods for reducing exhaust energy delivered to a twin scroll turbine driving a turbine-generator in a split exhaust engine system, such as the engine system of FIGS. 1A-2. The approach improves engine efficiency through reduced dead volume between exhaust valves and turbine, reducing the incidence of turbine over-speed conditions and turbine generator NVH. Specifically, the split exhaust engine system may include a first exhaust valve (also herein referred to as a blowdown valve) for delivering a blowdown portion of exhaust gas from a first group of engine cylinders to a twin scroll turbine generator located in a first exhaust passage via a first exhaust manifold and deliver another portion of exhaust gas from a second group of engine cylinders to the twin scroll turbine generator via a second exhaust manifold, different from the first manifold, and a second exhaust valve (also herein referred to as a scavenging valve or scavenge valve) for delivering a scavenging portion of exhaust gas from the first and second group of engine cylinders to an exhaust catalyst via a third exhaust manifold. In response to a turbine speed greater than a threshold speed, a generator (power/current) output greater than a threshold output and/or a generator NVH greater than a threshold NVH, an engine controller included in the engine system may be configured to perform a control routine, such as the routine of FIG. 3 to selectively deactivate a blowdown valve in engine cylinders of one or more cylinder groups to reduce an amount of exhaust energy delivered to the twin scroll turbine. An example routine to determine a desired generator speed for determining the turbine speed threshold above which the blowdown valve in one or more cylinder groups may be selectively deactivated is shown at FIG. 4. The number of blowdown valves deactivated may be determined according to the example routine of FIG. 5. An example of valve timings including valve timings of the blowdown valve during nominal engine operation (that is, without blowdown valve deactivation) is illustrated at FIG. 6. An example adjustment of blowdown valve based on turbine speed, generator (power or current) output and/or generator NVH is shown at FIG. 7. In yet an another example, adjustment of the blowdown valve of cylinders in multiple cylinder groups may be conducted based on engine load conditions and component temperature as shown at FIG. 8.

By utilizing the systems and methods described herein, the technical effect of reducing exhaust energy delivered to the twin scroll turbine of the turbine-driven generator via blowdown valve selective deactivation in the split exhaust engine system may be achieved.

FIG. 1A shows a schematic diagram of a naturally aspirated multi-cylinder internal combustion engine 10, which may be included in a propulsion system of an automobile. Engine 10 may include a plurality of combustion chambers (that is, cylinders) 20. In the depicted example, engine 10 includes four cylinders, cylinders 1 through cylinder 4, arranged in an in-line configuration. However, in alternate examples, engine 10 can include one or more cylinders such as 2, 3, 4, 5, 6, 8, 10 or more cylinders, arranged in alternate configurations, such as V-6, I-6, V-12, opposed 4, boxer, etc.

Each cylinder 20 of engine 10 may be configured to receive intake air from an intake manifold 27 via an air intake passage 28. Intake passage 28 may include an air intake throttle 62 downstream of an air filter 60. The position of throttle 62 can be adjusted by control system 15 via a throttle actuator (not shown) communicatively coupled to controller 12. By modulating throttle 62, an amount of fresh air may be inducted from the atmosphere into engine 10 and delivered to the engine cylinders at or below barometric (or atmospheric) pressure via intake passage 28. Intake manifold 27 may be coupled to the combustion chambers via intake ports (not shown). Each intake port may supply air and/or fuel to the cylinder it is coupled to for combustion. Each cylinder intake port can selectively communicate with the cylinder via one or more intake valves. In the depicted example, each cylinder 20 is shown with two intake valves I1 and I2. In one example, an intake passage may be formed from intake manifold 27 selectively communicating with each intake valve. In other embodiments, an intake passage for a single cylinder may be split close to the cylinder into two adjacent paths with a wall in-between, each split path of the passage communicating with a single intake valve. In another example, each of the two intake valves may be controlled to open at specific engine speeds and therefore, may communicate through a common intake port with the intake manifold.

Each combustion chamber may exhaust combustion gases via two exhaust ports coupled thereto. In the depicted example, each cylinder 20 is coupled to a first exhaust port 31 via a first exhaust valve E1, and to a second exhaust port 33 via a second exhaust valve E2. Each exhaust port of each cylinder of a first and second cylinder group may lead to different exhaust manifolds for channeling a first initial portion of exhaust gas (also herein referred to as blowdown portion) and a second latter portion of exhaust gases (also herein referred to as scavenging portion) separately. For example, each of the first exhaust ports 31 of the cylinders 20 from a first cylinder group may combine into a first exhaust manifold 59a, and each of the first exhaust ports 31 of the cylinders 20 from a second cylinder group may combine into a second exhaust manifold 59b. Similarly, each of the second exhaust ports 33 from each of the cylinders 20 may combine into a third exhaust manifold 57. In this way, each combustion chamber 20 of the first and second cylinder groups may exhaust a blowdown portion of combustion gases into first exhaust manifold 59a and a second exhaust manifold 59b, respectively via first exhaust valve E1, and exhaust a scavenging portion of combustion gases into third exhaust manifold 57 via second exhaust valve E2. Such an exhaust system including three exhaust manifolds, two manifolds for conducting the blowdown portion of the exhaust, and the third manifold for conducting the scavenging portion of the exhaust will be referred to herein as the "split exhaust system".

Engine 10 may include a turbine-driven generator 190 located in a first exhaust passage 55a (coupled to the first exhaust manifold 59a) and second exhaust passage 55b (coupled to the second exhaust manifold 59b). Turbine-driven generator 190 may include an exhaust twin scroll turbine 92 and a generator 94 coupled on a common shaft. Further, a waste-gate 127a and 127b may be included in a bypass 166 coupled between an inlet and outlet of the exhaust twin scroll turbine to control an amount of exhaust gas delivered to the twin scroll turbine. In some examples, the waste-gate may be included along both exhaust passages 55a and 55b, and in other examples the waste-gate may not be included. In such systems without a waste-gate, the amount of exhaust gas delivered to the turbine may be controlled mainly by deactivating the blowdown valves.

As discussed above, the exhaust manifolds may be designed to separately channel the blowdown and the scavenging portions of the exhaust. Exhaust manifold 59a may channel the first portion of blowdown pulse of the exhaust from the first cylinder group to turbine 92 of turbine-generator 190 via first exhaust passage 55a, and exhaust manifold 59b may channel a second portion of blowdown pulse of the exhaust from the second cylinder group to turbine 92 while exhaust manifold 57 may channel the scavenging portion of exhaust via a third exhaust passage 162 to downstream of turbine 92 and upstream of an emission control device 72. For example, exhaust valves E1 channel the first blowdown portion of the exhaust gases from the first cylinder group through exhaust manifold 59a and first exhaust passage 55a to the twin scroll turbine and the second blowdown portion of the exhaust gases from the second cylinder group through exhaust manifold 59b and second exhaust passage 55b while exhaust valves E2 channel the scavenging portion of exhaust gases through exhaust manifold 57 via second exhaust passage 162 to emission control device 72. As such, the first exhaust valve of cylinders from the first and second cylinder group may open at a timing earlier than the second exhaust valve, and may be closed at a timing earlier than the second exhaust valve.

Exhaust gases exiting turbine 92 may pass through emission control device 72 as well. Emission control device 72 can include multiple catalyst bricks, in one example. In another example, multiple emission control devices, each with multiple bricks, can be used. In some examples, emission control device 72 may be a three-way type catalyst. In other examples, emission control device 72 may include one or a plurality of a diesel oxidation catalyst (DOC), and a selective catalytic reduction catalyst (SCR). After passing through emission control device 72, exhaust gas may be directed out to a tailpipe 58.

In this way, combusted gases exiting a cylinder may be separated into two parts via three distinct exhaust passages formed by the split exhaust manifold. For example, in one combustion cycle, first exhaust valve E1 of cylinder 20 of both the first and second cylinder groups may channel a first portion of the exhaust, namely the blowdown portion, to turbine 92 via a first exhaust passages 55a and a second exhaust passage 55b, respectively, and a second exhaust valve E2 of the same cylinder (20) of both cylinder groups may direct a latter portion of exhaust gases following the blowdown portion to an emission control device 72 via the second passage 162. The latter portion of exhaust gases exiting via the second exhaust valve E2 may primarily be the scavenging portion of exhaust gases.

In FIG. 1A, fuel injectors are shown coupled directly to the combustion chambers for injecting fuel directly therein in proportion to a pulse width of a signal FPW received from controller 12 via an electronic driver, for example. Each cylinder 20 is shown coupled with two injectors 74 and 76 per cylinder at each intake valve. In this manner, the fuel injectors provide what is known as direct injection of fuel into the combustion chamber. Each respective fuel injector may be mounted in the side of the respective combustion chamber or in the top of the respective combustion chamber, for example. In some examples, one or more fuel injectors may be arranged in intake manifold 27 in a configuration that provides what is known as port injection of fuel into the intake ports upstream of the respective combustion chambers. Though not shown in FIG. 1A, fuel may be delivered to the fuel injectors by a fuel system including a fuel tank, a fuel pump, a fuel line, and a fuel rail.

In some examples, a distributorless ignition system (not shown) may provide an ignition spark to spark plugs (not shown) coupled to combustion chambers 20 in response to controller 12.

Engine 10 may be controlled at least partially by a control system 15 including controller 12 and by input from a vehicle operator via an input device, an accelerator pedal input for example as discussed later at FIG. 2. Control system 15 is shown receiving information from a plurality of sensors 16 (various examples of which are described herein) and sending control signals to a plurality of actuators 81. As one example, sensors 16 may include turbo-compressor inlet pressure and temperature sensors, and manifold air pressure (MAP) sensors located within the intake passage. Other sensors may include a throttle inlet pressure (TIP) sensor for estimating a throttle inlet pressure (TIP) and/or a throttle inlet temperature sensor for estimating a throttle air temperature (TCT) coupled downstream of the throttle in the intake passage. Additional system sensors and actuators are elaborated below with reference to FIG. 2. As another example, actuators 81 may include fuel injectors, and throttle 62. Controller 12 may receive input data from the various sensors, process the input data, and trigger the actuators in response to the processed input data based on instruction or code programmed therein corresponding to one or more routines. Example control routines are described herein with respect to FIGS. 3-5.

Delivering exhaust flow from cylinders of the first cylinder group via a first scroll and exhaust flow from cylinders of the second cylinder group via a second scroll reduces the need for the extensive network of exhaust manifolds, limiting energy losses in the exhaust system and improving engine performance.

Referring to FIG. 1B, a 3-D view is depicted of a naturally aspirated multi-cylinder internal combustion engine 10, which may be included in a propulsion system of an automobile. As such, components previously introduced in FIG. 1A are represented with the same reference numbers and are not re-introduced. Engine 10 may include a plurality of combustion chambers. In the depicted example, engine 10 includes a blowdown valve 31 and a scavenging valve 33 from four cylinders arranged in an in-line configuration.

The blowdown valve in a first and second cylinder may be connected to a first exhaust manifold 59a which leads to a first exhaust passage 55a connected to a twin scroll turbine 92, coupled to a generator 94. Herein the first and second cylinder may be cylinders of the same group, such as cylinder 1 and 2 of FIG. 1A. Further, the blowdown valve in a third and fourth cylinder may be connected to a second exhaust manifold 59b which leads to a second exhaust passage connected to the twin scroll turbine. Herein the third and fourth cylinder may be cylinders of the same cylinder group, such as cylinder 3 and 4 of FIG. 1A. A turbine flange 56 may be coupled at a junction of first exhaust manifold 59a and second exhaust manifold 59b with turbine 92. As illustrated by the cross sectional view of the turbine flange through plane M-M', the first and second exhaust passage may be connected to the twin scroll turbine via separate inlets. In this way, flowing exhaust from the blowdown valve in cylinders 1 and 2 to the turbine via a first exhaust passage, and exhaust from blowdown valves in cylinders 3 and 4 to the turbine via a second exhaust passage, reduces the exhaust manifold volume between each individual cylinder and the turbine, minimizes energy losses and allows efficient delivery of exhaust energy to the turbine, leading to improved engine efficiency.

The scavenging valve 33 in all cylinders may be connected to a common exhaust passage 57, bypassing the twin scroll turbine and leading to an emission control device 72, downstream of the twin scroll turbine. After passing through emission control device 72, exhaust gas may be directed out to a tailpipe 58.

Referring to FIG. 2, map 200 depicts a partial view of a single cylinder of internal combustion engine 10. As such, components previously introduced in FIG. 1A are represented with the same reference numbers and are not re-introduced. The engine 10 may be controlled at least partially by a control system including a controller 12 and by input from a vehicle operator 214 via an input device 216. In this example, the input device 216 includes an accelerator pedal and a pedal position sensor 218 for generating a proportional pedal position signal (PP).

Engine 10 is depicted with combustion chamber (cylinder) 20, coolant sleeve 213, and cylinder walls 232 with piston 236 positioned therein and connected to crankshaft 240. Combustion chamber 20 is shown communicating with intake passage 146 and exhaust passage 148 via respective intake valve 252 and exhaust valve 256. As previously described in FIG. 1A, each cylinder of engine 10 may exhaust combustion products along two conduits. In the depicted view 200, exhaust passage 148 represents the first exhaust port leading from the cylinder to the turbine (such as exhaust port 33 of FIG. 1A) while the second exhaust conduit leading to the exhaust catalyst is not visible in this view.

As also previously elaborated in FIG. 1A, each cylinder of engine 10 may include two (or more) intake valves and two (or more) exhaust valves. In the depicted view 200, intake valve 252 and exhaust valve 256 are located at an upper region of combustion chamber 20. Intake valve 252 and exhaust valve 256 may be controlled by controller 12 using respective cam actuation systems including one or more cams. The cam actuation systems may utilize one or more of cam profile switching (CPS), variable cam timing (VCT), variable valve timing (VVT) and/or variable valve lift (VVL) systems to vary valve operation. In the depicted example, each intake valve 252 is controlled by an intake cam 251 and each exhaust valve 256 is controlled by an exhaust cam 253. The position of intake valve 252 and exhaust valve 256 may be determined by valve position sensors 255 and 257, respectively.

In alternate embodiments, the intake and/or exhaust valve may be controlled by electric valve actuation. For example, cylinder 20 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In one example, intake cam 251 includes separate and different cam lobes that provide different valve profiles (e.g., valve timing, valve lift, duration, etc.) for each of the two intake valves of combustion chamber 20. Likewise, exhaust cam 253 may include separate and different cam lobes that provide different valve profiles (e.g., valve timing, valve lift, duration, etc.) for each of the two exhaust valves of combustion chamber 20. In another example, intake cam 251 may include a common lobe, or similar lobes, that provide a substantially similar valve profile for each of the two intake valves.

In addition, different cam profiles for the different exhaust valves can be used to separate exhaust gases exhausted at low cylinder pressure from exhaust gases exhausted at exhaust pressure. For example, a first exhaust cam profile can open from closed position the first exhaust valve just before BDC (bottom dead center) of the power stroke of combustion chamber 20 and close the same exhaust valve well before top dead center (TDC) to selectively exhaust blowdown gases from the combustion chamber. Further, a second exhaust cam profile can be positioned to open from close a second exhaust valve at about the mid-point of the exhaust stroke and close it before TDC to selectively exhaust the scavenging portion of the exhaust gases.

Continuing with FIG. 2, exhaust gas sensor 226 is shown coupled to exhaust passage 148. Sensor 226 may be positioned in the exhaust passage upstream of one or more emission control devices, such as device 72 of FIG. 1A. Sensor 226 may be selected from among various suitable sensors for providing an indication of exhaust gas air/fuel ratio such as a linear oxygen sensor or universal or wide-range exhaust gas oxygen (UEGO), a two-state oxygen sensor or EGO (as depicted), a heated exhaust gas oxygen (HEGO), a NOx, HC, or CO sensor, for example. The downstream emission control devices may include one or more of a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Cylinder 20 can have a compression ratio, which is the ratio of volumes when piston 236 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 91 for initiating combustion. Ignition system 288 can provide an ignition spark to combustion chamber 20 via spark plug 91 in response to spark advance signal SA from controller 12, under select operating modes.

However, in some embodiments, spark plug 91 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 20 is shown including one fuel injector 66. Fuel injector 66 is shown coupled directly to combustion chamber 20 for injecting fuel directly therein in proportion to the pulse width of signal FPW received from controller 12 via electronic driver 268. In this manner, fuel injector 66 provides what is known as direct injection (hereafter also referred to as "DI") of fuel into combustion cylinder 20. While FIG. 2 shows injector 66 as a side injector, it may also be located overhead of the piston, such as near the position of spark plug 91. Such a position may improve mixing and combustion when operating the engine with an alcohol-based fuel due to the lower volatility of some alcohol-based fuels. Alternatively, the injector may be located overhead and near the intake valve to improve mixing. In an alternate embodiment, injector 66 may be a port injector providing fuel into the intake port upstream of cylinder 20.

Fuel may be delivered to fuel injector 66 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 8 may hold fuel with different fuel qualities, such as different fuel compositions. These differences may include different alcohol content, different octane, different heat of vaporizations, different fuel blends, and/or combinations thereof etc. In some embodiments, fuel system 8 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Controller 12 is shown in FIG. 2 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 48; engine coolant temperature (ECT) from temperature sensor 212 coupled to coolant sleeve 213; a profile ignition pickup signal (PIP) from Hall effect sensor 220 (or other type) coupled to crankshaft 240; throttle position (TP) from a throttle position sensor; absolute manifold pressure signal (MAP) from sensor 98, cylinder AFR from EGO sensor 226, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 66, throttle 62, spark plug 91, intake/exhaust valves and cams, etc. The controller may receive input data from the various sensors, process the input data, and trigger the actuators in response to the processed input data based on instruction or code programmed therein corresponding to one or more routines. As an example, in response to turbine speed being higher than a threshold, the controller may deactivate a valve mechanism coupled to an exhaust valve of at least one cylinder in a first and second cylinder group to reduce exhaust flow from the cylinder to the turbine. Example control routines will be described later with regard to FIGS. 3-5.

In this way, the system of FIGS. 1-2 enables a method for an engine, comprising: delivering exhaust from a first exhaust valve of all cylinders of a first cylinder group to a first scroll of an exhaust turbine while delivering exhaust from a first exhaust valve of all cylinders of a second cylinder group to a second scroll of the exhaust turbine; and delivering exhaust from a second exhaust valve of all cylinders of the first and second cylinder group to an exhaust catalyst, while bypassing the turbine. Further, in response to turbine speed greater than a threshold speed, the method includes selectively deactivating the first exhaust valve of one or more cylinders of the first and second cylinder group. Further, the method may include driving a generator via the turbine.

Figure 3:
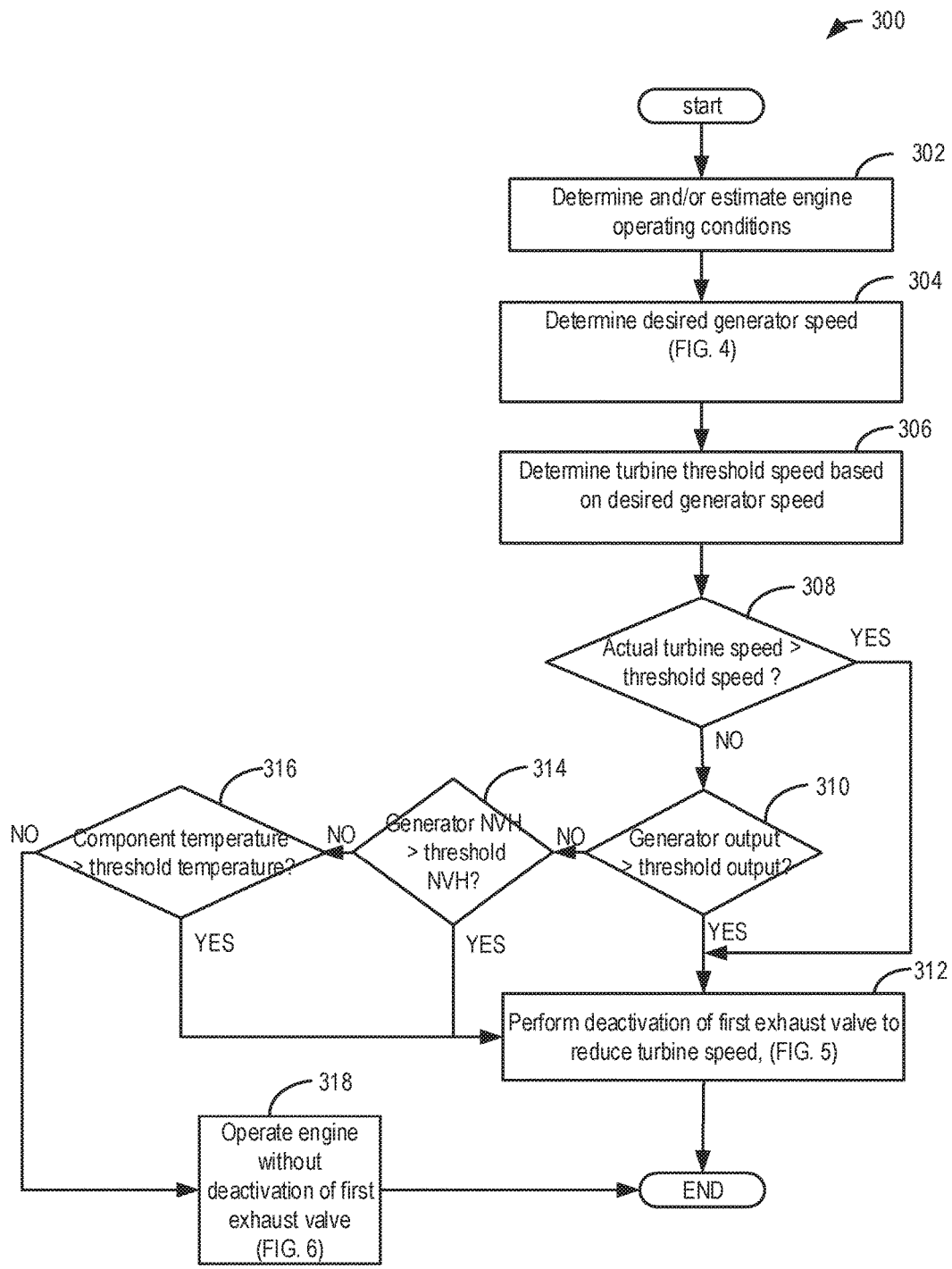
FIG. 3 shows a high level flow chart illustrating an example routine for reducing energy provided to a twin scroll turbine of the turbine generator in order to control a turbine generator speed and/or turbine generator power or current output and/or turbine generator NVH and/or component temperature.
Figure 4:
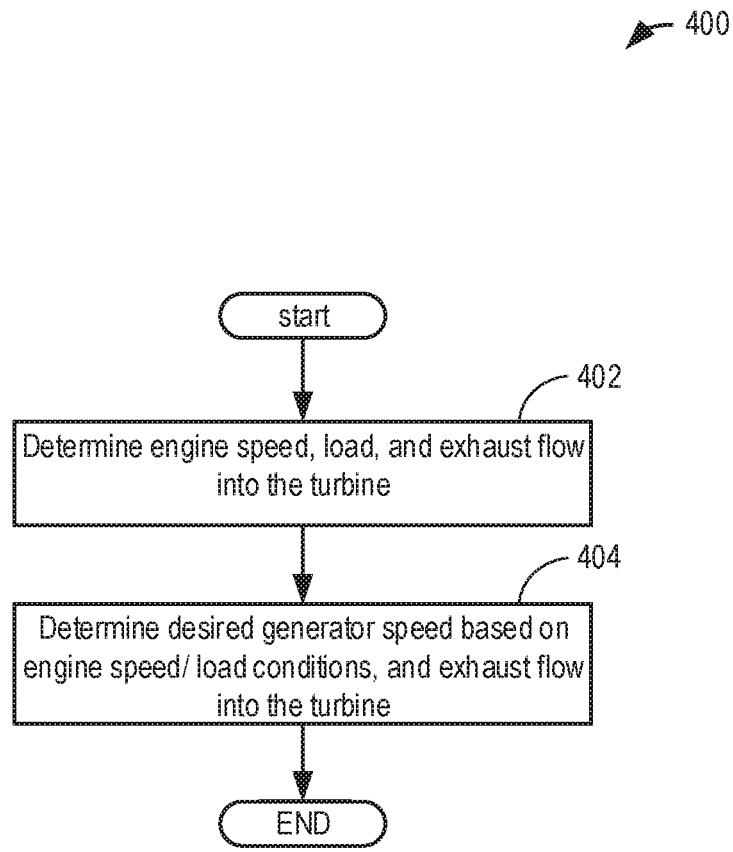
FIG. 4 shows a high level flow chart illustrating an example routine for determining a desired turbine generator speed, to be used in conjunction with FIG. 3.

Turning to FIG. 3, a method 300 for adjusting blowdown exhaust gas delivered to a twin scroll turbine of a turbine-generator (e.g., turbine-generator 190 at FIG. 1A) included in a split exhaust system is provided. For example, in order to address one or more of turbine-over speed, generator output, generator NVH, and over-temperature of components (such as cylinder head, exhaust valves, exhaust manifold, turbine, catalyst, etc.), an amount of blowdown gases delivered to the turbine may be reduced. Instructions for carrying out method 300 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, method 300 includes estimating and/or measuring engine operating conditions. Operating conditions may include but are not limited to driver torque demand, electrical load, MAP, MAF, turbine speed, generator speed, generator output (power or current), generator NVH, engine speed, engine load, accelerator position, throttle position, vehicle speed, engine temperature, exhaust mass flow, exhaust temperature, the temperature of various components (such as cylinder head, exhaust valves, exhaust manifold, turbine, catalyst, etc.), and ambient conditions such as temperature. The generator output (power or current) and generator NVH may be inferred based on the rotation speed of a turbine driving the generator, the generator output and NVH increasing as the turbine speed increases. Alternatively, the generator NVH may be inferred from generator conditions such as one or more of a generator output voltage, a generator output current, and a generator output power. Further, component temperature may inferred based on engine load-speed, exhaust temperature, ambient temperature, vehicle speed, etc. In addition or alternatively, the component temperature may be directly measured using a temperature sensor coupled to the engine.

At 304, method 300 may include determining a desired generator speed based on the estimated operating conditions to obtain a desired generator output and reduce the generator NVH below a threshold level. Alternatively, the controller may determine a target turbine speed that maintains the generator NVH below the threshold level. Details of determining the desired turbine or generator speed will be further elaborated with respect to FIG. 4. Next, at 306, the method may include determining a threshold turbine speed based on the desired generator speed at the current engine speed-load conditions. As such, the threshold turbine speed may be a turbine speed above which an efficiency of the turbine may decrease. Alternatively, the threshold turbine speed may be a turbine speed above which turbine performance and generator NVH may be reduced at the current exhaust temperature and ambient temperature.

Upon determining the desired threshold speed, at 308, method 300 may include determining if an actual turbine speed is greater than the threshold turbine speed. The actual turbine speed may be measured by a sensor coupled to the turbine shaft, or may be inferred based on turbine conditions. If the answer at 308 is YES, the method may proceed to 312. At 312, the method may include selectively deactivating individual valve mechanisms for a first exhaust valve of one or more cylinders of a first and second cylinder group to reduce turbine speed. For example, the individual valve mechanisms may be deactivated according to a first cylinder pattern during a first operating condition where the turbine speed is higher than the threshold speed. As another example, during a second, operating condition where the turbine speed is higher than the threshold speed, the second operating condition different from and mutually exclusive from the first operating condition, the individual valve mechanisms may be deactivated according to a second cylinder pattern. In yet another example, during a third, operating condition where the turbine speed is higher than the threshold speed, the third operating condition different from and mutually exclusive from the first and second operating condition, the individual valve mechanisms may be deactivated according to a third cylinder pattern. Each of the first, second and third cylinder patterns may be based on one or more of turbine speed, engine speed, engine load, engine temperature, and transmission gear selection. For example, in the first, the second and the third cylinder pattern, a number and identity of cylinders whose first exhaust valve is selectively deactivated may be selected based on the turbine speed relative to the threshold speed, as elaborated with reference to FIG. 5. As a non-limiting example, the first, second and third turbine over-speed conditions may be associated with different levels of generator output and generator NVH (since the turbine drives the generator) and therefore the first, second and third cylinder patterns may vary. As another example, the first, second and third turbine over-speed conditions may be associated with different levels of engine heating and therefore the first, second and third cylinder patterns may vary. The first exhaust valve in one or more cylinders of the first and/or second cylinder group may be selectively deactivated via hydraulically actuated lifters, via a decoupling pin in the valve train, via a lost motion mechanism, or via a cam profile switching (CPS) mechanism in which a cam profile with no lift may be used for deactivated valves. In one example, deactivation of the first exhaust valve in one or more cylinders of the first and second cylinder group may be controlled by a cam-based VDE actuator. In another example, a single cylinder valve actuator may selectively deactivate the first exhaust valve in one or more cylinders of the first and second cylinder group. As such, the deactivated first exhaust valve in one or more cylinders of the first and second cylinder group may be held in a closed position for a cycle of the cylinder (or held in a fixed position for the cycle). Details of deactivation of the first exhaust valve in one or more cylinders of the first and second cylinder group to reduce turbine speed will be further elaborated with respect to FIG. 5.

Returning to 308, if it is determined that the actual turbine speed is less than the threshold turbine speed, the method may proceed to 310 to determine if a generator (power or current) output is greater than a threshold output. As such, the threshold output may be determined based on the desired turbine speed and may reflect a maximum output above which engine performance may be affected. If the answer is at 310 is YES, the method may proceed 312 to perform selective deactivation of the first exhaust valve in one or more cylinders of the first and second cylinder group to reduce turbine speed. By reducing the turbine speed, the power or current output of the generator may be decreased and maintained at threshold levels. For example, the individual valve mechanisms may be deactivated according to a second cylinder pattern with a number and identity of cylinders whose first exhaust valve is selectively deactivated selected based on the turbine speed higher than the threshold speed and a higher generator (power or current) output, as elaborated with reference to FIG. 5. In one example, the second cylinder pattern may be selected responsive to the turbine speed higher than the threshold speed and a higher generator output. Further, the second cylinder pattern may decrease the turbine speed to a lower value than the decrease in turbine speed brought about by the first cylinder pattern selected responsive to the rise in turbine speed.

If the answer at 310 is NO, (e.g., the generator output is less than the threshold output), the method may proceed to 314. At 314, the method may include determining if a difference between an actual generator NVH and a threshold generator NVH is greater than a threshold difference. The actual generator NVH may be inferred based on engine operating conditions, such as turbine speed, or estimated via a vibration sensor. For example, elevated generator NVH may occur when the turbine speed is higher than a threshold. If the answer at 314 is YES, the method may proceed to 312 to perform selective deactivation of the first exhaust valve in one or more cylinders of the first and second cylinder group to reduce turbine speed. By reducing the turbine speed, the vibration of the turbine-generator may be decreased. For example, the individual valve mechanisms may be deactivated according to a third cylinder pattern with a number and identity of cylinders whose first exhaust valve is selectively deactivated selected based on the turbine speed higher than the threshold speed (and a higher generator vibration), as elaborated with reference to FIG. 5. In one example, the third cylinder pattern may be selected responsive to the turbine speed higher than the threshold speed and the rise in generator vibration. Further, the third cylinder pattern may decrease the turbine speed to a lower value than the decrease in turbine speed brought about by the first cylinder pattern selected responsive to the rise in turbine speed and a lower generator vibration. As one example, the number of cylinders whose first exhaust valve is deactivated in the first, second and third cylinder pattern may be the same, however the identity of the cylinders may be different. In still other examples, the number of deactivated cylinders may be different. Details of selective deactivation of the first exhaust valve to reduce turbine speed, and consequently generator vibration will be further elaborated with respect to FIG. 5.

If the answer at 314 is NO (that is, if the difference between the actual generation vibration and threshold vibration is less than the threshold difference), the method may proceed to 316 to determine if an actual component temperature is greater than a threshold component temperature. As such, the threshold component temperature may be determined based on a desired engine load condition and engine speed and may reflect a maximum component temperature above which engine performance may be affected. If the answer at 316 is YES, the method may proceed to 312 to perform deactivation of the first exhaust valve in one or more cylinders of the first and second cylinder group to reduce component temperature. For example, individual valve mechanisms may be deactivated according to a fourth cylinder pattern with a number and identity of cylinders whose first exhaust valve is deactivated based on the component temperature, as elaborated with reference to FIG. 5.

If the answer at 316 is NO (that is, if the actual component temperature is less than the threshold component temperature), the method may proceed to 318. At 318, the method may include operating the engine without blowdown valve deactivation. That is, if it is determined that the turbine speed is below threshold speed, the generator output is below threshold output, the generator vibration is below threshold vibration and the component temperature is less than the threshold component temperature, valve deactivation to reduce exhaust energy to turbine may not be performed and the engine may be operated with all first valves of all engine cylinders active. In other words, engine may be operated in a nominal mode, wherein the nominal engine operation may include, for each cylinder, opening the first exhaust valve initially during an engine cycle to deliver an initial portion of exhaust energy to turbine via the blowdown valve and then subsequently during the same engine cycle, opening a second exhaust valve of the cylinder to deliver a latter portion of the exhaust energy to the exhaust catalyst. Details of nominal engine operation will be further elaborated with respect to FIG. 6.

In this way, issues related to turbine over-speed conditions (including generator output and generator NVH), and component over-temperature conditions may be addressed by a controller selectively deactivating the first exhaust valve of one or more cylinders of the first and second cylinder group to reduce the amount of blowdown energy delivered to the twin scroll turbine.

It will be appreciated that in alternate examples, in addition to selectively deactivating individual first exhaust valve mechanisms, in response to the turbine speed greater than the threshold speed or the generator output greater than the threshold output or the difference between the generator vibration and threshold generator vibration being greater than a threshold difference, an opening of a waste gate valve in the first and second exhaust passage (e.g., valves 127a and 127b of FIG. 1A) delivering exhaust from engine cylinders to the turbine may be adjusted to limit exhaust mass flow to the turbine to reduce turbine speed.

Referring to FIG. 4, an example method 400 for determining a desired generator speed of a turbine-generator (e.g., turbine-generator 190 at FIG. 1A) located in a first exhaust manifold and a second exhaust manifold (e.g., first exhaust manifold 59a and second exhaust manifold 59b at FIG. 1A) of an engine system with split exhaust manifold (e.g., engine system 10 at FIG. 1A) is shown. The desired generator speed may be a generator speed at which the turbine-generator may operate with respect to current engine operating conditions with a desired generator output and reduced generator NVH (such as with NVH below a threshold level). The method of FIG. 4 may be used in conjunction with the method of FIG. 3. For example, method 400 may be performed at step 304 of method 300. The method of FIG. 4 may be stored as executable instructions in non-transitory memory of controller 12 shown in FIGS. 1A-2.

At 402, the routine may include determining engine operating conditions including engine load, engine speed, turbine speed, exhaust temperature, and an exhaust mass flow to the turbine. Upon determining engine operating conditions, the method includes, at 404, determining a desired generator speed (or speed range) based on the current engine speed/load conditions, and further based on exhaust mass flow into the twin scroll turbine. The desired generator speed or speed range may correspond to a range where generator output is maintained at desired output levels and generator NVH is maintained below a threshold level that may be objectionable to the vehicle operator. The threshold level may be varied based on operating conditions such as vehicle speed. In one example, the desired generator speed may be determined from a look-up table storing the desired generator speed as a function of engine load and engine speed. Further, the desired generator speed may be based on a turbine efficiency. In one example, as engine speed increases, the generator output and generator vibration may increase. In another example, as mass exhaust flow to the turbine increases, the generator output and generator vibration may increase.

After determining the desired generator speed, the controller may further adjust the turbine speed to maintain the generator at the desired generator speed (or speed range).

In this way, by setting the desired generator speed based on engine load conditions/engine speed, and exhaust flow to the turbine, vibration of the turbine-generator may be adjusted for improved efficiency and performance.

Figure 5:
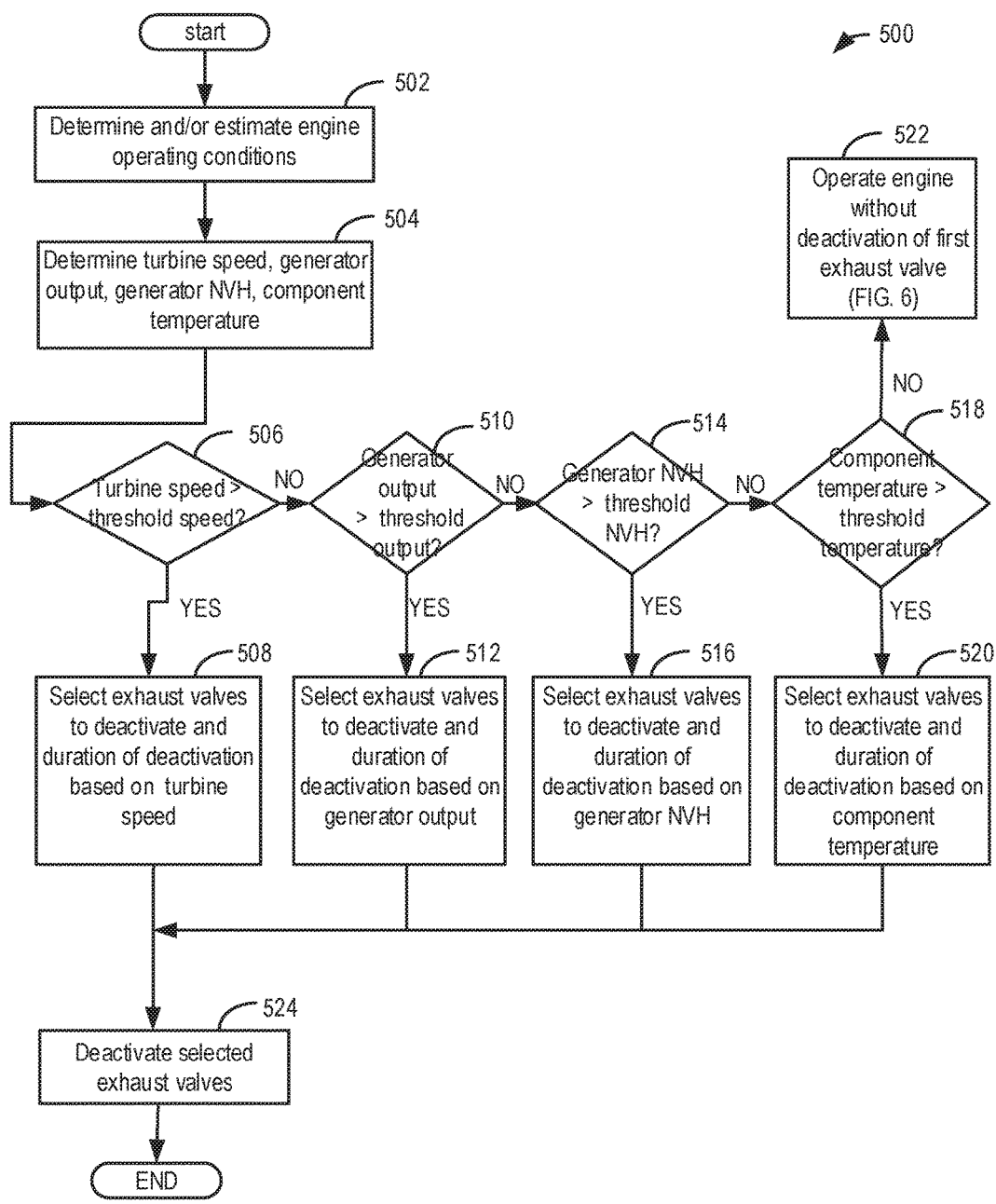
FIG. 5 shows a high level flow chart illustrating an example routine for performing selective valve deactivation for reducing energy provided to the twin scroll turbine of the turbine-generator, to be used in conjunction with FIG. 3.

Referring to FIG. 5, method 500 depicts an example method for selectively deactivating the first exhaust valve of one or more cylinders of a first and/or second cylinder group to reduce exhaust energy delivered to a turbine of a turbine-generator to reduce turbine over-speed conditions. The method also enables a generator output to be maintained at threshold levels, generator vibration to be reduced, and cylinder overheating to be addressed.

The method of FIG. 5 may be used in conjunction with the method of FIG. 3. For example, method 500 may be performed at step 312 of method 300. The method of FIG. 5 may be stored as executable instructions in non-transitory memory of controller 12 shown in FIGS. 1A-2.

At 502, method 500 may include determining and/or estimating engine operating conditions. Engine operating conditions may include but are not limited to turbine speed, generator speed, generator (power or current) output, generator vibration, engine speed, accelerator position, throttle position, vehicle speed, engine temperature, component temperature, exhaust mass flow, and engine load. Next, at 504, the method may include determining (estimating or inferring) a turbine speed, a generator output, an actual generator NVH, and a component temperature. In addition, a threshold value of generator output, a threshold value of generator NVH and a threshold value of component temperature may be retrieved from the controller's memory or determined based on the engine operating conditions. As such, the threshold generator output, threshold generator NVH and threshold component temperature may be based on an engine speed, an engine load, and an exhaust flow rate into the turbine. Further, the generator output threshold and NVH threshold may be based on vehicle speed and turbine speed.

Next, at 506, the method may include selecting one or more exhaust valves to deactivate, and duration of deactivation based on turbine speed. In one example, selecting the one or more exhaust valves to deactivate includes determining if turbine speed is greater than a threshold turbine speed. If YES, the routine may proceed to 508. At 508, the method may include determining a number and identity of cylinders of the first and second cylinder group whose first exhaust valve is selectively deactivated based on a difference between the turbine speed and the threshold turbine speed. In addition, a duration of selectively deactivating the first exhaust valve in the selected one or more cylinders of the first and second cylinder group may be based on the difference between the turbine speed and the threshold turbine speed.

For example, if the difference is higher than a first threshold, a smaller number of cylinders may be selected for deactivation and/or the first exhaust valve of the selected cylinders may be deactivated for a shorter duration. In comparison, if the difference is higher than a second threshold, the second threshold larger than the first threshold, a larger number of cylinders may be selected for deactivation and/or the first exhaust valve of the selected cylinders may be deactivated for a longer duration. The number and identity of the cylinders selected for deactivation may be adjusted to provide a first cylinder pattern based on the turbine speed.

For example, an in-line engine may have four cylinders divided into cylinder groups, each cylinder group having two cylinders, each cylinder having a first exhaust valve and a second exhaust valve. Herein, when the difference between the turbine speed and the threshold turbine speed is higher than the first threshold, a single cylinder of the first cylinder group or a single cylinder of the second cylinder group may be selected and the first exhaust valve of the selected cylinder may be deactivated (while the second exhaust valve continues to operate). Alternatively, a single cylinder of the first cylinder group and a single cylinder of the second cylinder group may each be selected and the first exhaust valve of the selected cylinders may be deactivated (while the second exhaust valve continues to operate). The single cylinder of the first cylinder group and the single cylinder of the second cylinder group may be selected based on their position along an engine clock and/or their firing order. For example, if the 4 cylinders were numbers 1-4 from one end of the engine block to the other end, with cylinders 1-2 grouped together as a first cylinder group and cylinders 3-4 grouped together as a second cylinder group, the cylinders fired in the order 1-3-4-2, cylinders 1 and 4 may be selected together for first exhaust valve deactivation, or cylinder 2 and 3 may be selected together for first exhaust valve deactivation.

With reference to the same engine configuration, when the difference between the turbine speed and the threshold turbine speed is higher than the second threshold, both cylinders of the first cylinder group and both cylinders of the second cylinder group may be selected and the first exhaust valve of all the selected cylinders may be deactivated. In this example, the first exhaust valve of all cylinders may be deactivated while the cylinders continue to be operated and with the intake valves and the second exhaust valve continuing to open and close over the engine cycle. In one example, the first and second threshold may be associated with different levels of generator (power or current) output and generator NVH. For example, the first threshold may be associated with lower generator (power or current) output and lower generator NVH than the second threshold.

Returning to 506, if the turbine speed is not greater than the threshold turbine speed, the method may proceed to 510. At 510, the method may include determining if a generator output is greater than a threshold output. If YES, the method may proceed to 512. At 512, the method may include selecting one or more exhaust valves to deactivate, and a duration of deactivation based on turbine speed. In one example, selecting the one or more exhaust valves to deactivate includes determining a number and identity of cylinders of the first and second cylinder group whose first exhaust valve is selectively deactivated based on a difference between the generator output and the threshold output. In addition, a duration of selectively deactivating the first exhaust valve in the selected one or more cylinders of the first and second cylinder group may be based on the difference between the generator output and the threshold output. For example, if the difference is higher than a first threshold level, a smaller number of cylinders may be selected for deactivation and/or the first exhaust valve of the selected cylinders may be deactivated for a shorter duration. In comparison, if the difference is higher than a second threshold level, the second threshold level larger than the first threshold level, a larger number of cylinders may be selected for deactivation and/or the first exhaust valve of the selected cylinders may be deactivated for a longer duration. The number and identity of the cylinders selected for deactivation may be adjusted to provide a second cylinder pattern based on the turbine speed higher than the threshold speed (and a higher generator output).

The second cylinder pattern may be different from the first cylinder pattern of deactivation. For example, the first and second cylinder patterns may have a different total number of deactivated cylinders. In another example, the first and second cylinder patterns may have the same total number of deactivated cylinders, but the identity of the deactivated cylinders may be different.

Returning to 510, if the generator output is not greater than the threshold output, the method may proceed to 514. At 514 the method may include determining if a difference between an actual generator NVH and a threshold NVH is greater than a threshold difference. If the answer at 514 is YES, the method may proceed to 516. At 516, the method may include selecting one or more exhaust valves to deactivate, and duration of deactivation based on generator NVH. In one example, selecting the one or more exhaust valves to deactivate the method may include determining a number and identity of cylinders of the first and second cylinder group whose first exhaust valve is selectively deactivated based on the difference between the actual generator NVH and the threshold NVH. In addition, a duration of selectively deactivating the first exhaust valve in the selected one or more cylinders of the first and second cylinder group may be based on a relative vibration which is defined herein as a difference between the generator vibration and the threshold vibration. For example, if the difference is higher than a first threshold level, a smaller number of cylinders may be selected for deactivation and/or the first exhaust valve of the selected cylinders may be deactivated for a shorter duration. In comparison, if the difference is higher than a second threshold level, the second threshold level larger than the first threshold level, a larger number of cylinders may be selected for deactivation and/or the first exhaust valve of the selected cylinders may be deactivated for a longer duration. The number and identity of the cylinders selected for deactivation may be adjusted to provide a third cylinder pattern based on the turbine speed higher than the threshold speed (and a higher generator vibration).

The third cylinder pattern may be different from the first cylinder pattern of deactivation responsive to the turbine speed higher than the threshold speed (a lower generator vibration). For example, the first, second and third cylinder patterns may have a different total number of deactivated cylinders. In another example, the first, second and third cylinder patterns may have the same total number of deactivated cylinders, but the identity of the deactivated cylinders may be different.

Returning to 514, if the answer at 514 is NO, that is, if there is no difference between the actual generator vibration and the threshold vibration, the method may proceed to 518. At 518, the method may include determining if a component temperature is greater than a threshold component temperature. If the answer at 518 is YES, that is, if there is a difference between the actual component temperature and the threshold component temperature, the method may proceed to 520. At 520, the method may include selecting one or more exhaust valves to deactivate, and duration of deactivation based on component temperature. In one example, selecting the one or more exhaust valves to deactivate may include determining the number and identity of cylinders of the first and second cylinder group whose first exhaust valve is selectively deactivated based on the difference between the component temperature and the threshold component temperature. In addition, a duration of selectively deactivating the first exhaust valve in the selected one or more cylinders of the first and second cylinder group may be based on an engine load greater than a threshold engine load.

A number of cylinders whose first exhaust valve is selectively deactivated and duration of deactivation may be selected based on a difference between the component temperature and the threshold component temperature. For example, if the difference is higher than a first threshold temperature, a smaller number of cylinders may be selected for deactivation and/or the first exhaust valve of the selected cylinders may be deactivated for a shorter duration. In comparison, if the difference is higher than a second threshold temperature, the second threshold temperature larger than the first threshold temperature, a larger number of cylinders may be selected for deactivation and/or the first exhaust valve of the selected cylinders may be deactivated for a longer duration.

The number and identity of the cylinders selected for deactivation may be adjusted to provide a fourth cylinder pattern based on the component temperature. The fourth cylinder pattern may be different from the first cylinder pattern of deactivation responsive to turbine speed, and the second cylinder pattern of deactivation responsive to generator output, and the third cylinder pattern of deactivation responsive to generator vibration. For example, the first, second, third and fourth cylinder patterns may have a different total number of deactivated cylinders. In another example, the first, second, third and fourth cylinder patterns may have the same total number of deactivated cylinders, but the identity of the deactivated cylinders may be different.

Upon determining the number and identity of cylinders of the first and second cylinder group whose first exhaust valve is selectively deactivated and duration of deactivation based on turbine speed greater than the threshold turbine speed, generator output greater than threshold output, generator vibration greater than threshold vibration and/or component temperature greater than threshold component temperature, the method may proceed to 524. At 524, the routine may include deactivating the first exhaust valve of the cylinders of the first and second cylinder group selected for deactivation. For example, the first exhaust valve in one or more cylinders of the first and/or second cylinder group may be selectively deactivated via hydraulically actuated lifters, via a decoupling pin in the valve train, via a lost motion mechanism, or via a cam profile switching (CPS) mechanism in which a cam profile with no lift may be used for deactivated valves. In one example, deactivation of the first exhaust valve in one or more cylinders of the first and second cylinder group may be controlled by a cam-based VDE actuator. In another example, a single cylinder valve actuator may selectively deactivate the first exhaust valve in one or more cylinders of the first and second cylinder group. As such, the deactivated first exhaust valve in one or more cylinders of the first and second cylinder group may be held in a closed position for a cycle of the cylinder (or held in a fixed position for the cycle).

Returning to 518, if the answer at 518 is NO, that is, if there is no difference between the actual component temperature and the threshold component temperature, the method may proceed to 522. At 522, the method may include operating the engine without blowdown valve deactivation. That is, if it is determined that the turbine speed is below threshold speed, the generator output is below threshold output, the generator vibration is below threshold vibration and the component temperature is less than the threshold component temperature, valve deactivation to reduce exhaust energy to turbine may not be performed and the engine may be operated with all first valves of all engine cylinders active. In other words, engine may be operated in a nominal mode, wherein the nominal engine operation may include, for each cylinder, opening the first exhaust valve initially during an engine cycle to deliver an initial portion of exhaust energy to turbine via the blowdown valve and then subsequently during the same engine cycle, opening a second exhaust valve of the cylinder to deliver a latter portion of the exhaust energy to the exhaust catalyst. Details of nominal engine operation will be further elaborated with respect to FIG. 6.

In this way, by deactivating the first exhaust valve of cylinders of the first and second cylinder group selected for deactivation, the amount of exhaust energy delivered to the turbine may be decreased to limit turbine over-speed conditions, maintain desired generator output, reduce generator vibration, and reduce cylinder overheating.

In still further examples, deactivation of the first exhaust valve in one or more cylinders of the first and second cylinder group may be utilized to expedite heating of the exhaust catalyst in the split exhaust engine system. For example, when a temperature of the exhaust catalyst is below a threshold temperature (e.g., catalyst light off temperature or during catalyst warm-up), the first exhaust valve of all cylinders in the first and second cylinder group may be deactivated to direct all of the exhaust energy via a second exhaust valve to an exhaust catalyst. By supplying all of the exhaust energy to the exhaust catalyst, heating of the exhaust catalyst may be expedited.

Now turning to FIG. 6, an example is depicted of intake valve timing and exhaust valve timing, with respect to a piston position, for an engine system comprising delivering exhaust from a first exhaust valve of all cylinders of a first cylinder group to a first scroll of an exhaust turbine while delivering exhaust from a first exhaust valve of all cylinders of a second cylinder group to a second scroll of the exhaust turbine, and delivering exhaust from a second exhaust valve of all cylinders of the first and second cylinder group to an exhaust catalyst, while bypassing the turbine. The first exhaust valve of cylinders of the first and second cylinder group is also herein referred to as a blowdown valve and the second exhaust valve of cylinders of the first and second cylinder group is also herein referred to as a scavenging valve.

The valve timing depicted in FIG. 6 may be a valve timing that may be utilized during nominal engine operating conditions, which may include a turbine speed less than a threshold speed, a generator output less than a threshold output, a generator NVH less than a threshold NVH, and component temperature less than a threshold component temperature.

Map 600 illustrates a crankshaft position along the x-axis in crank angle degrees. Curve 602 depicts piston positions (along the y-axis), with reference to their location from top dead center (TDC) and further with reference to their location within the four strokes (intake, compression, power and exhaust) of an engine cycle.

During engine operation, each cylinder typically undergoes a four stroke cycle including an intake stroke, compression stroke, expansion stroke, and exhaust stroke. During the intake stroke, the exhaust valves close and intake valves open. Air is introduced into the cylinder via an intake passage, and the cylinder piston moves to the bottom of the cylinder so as to increase the volume within the cylinder. The position at which the piston is near the bottom of the cylinder and at the end of a piston stroke (e.g., when the combustion chamber is at its largest volume) is typically referred to by those of skill in the art as bottom dead center (BDC). Herein, the intake stroke BDC is indicated as 180 degrees before top dead center (180 BTDC). During the compression stroke, the intake valves and exhaust valves are closed. The piston moves toward the cylinder head so as to compress the air within the combustion chamber. The point at which the piston is at the end of the piston stroke and closest to the cylinder head (e.g., when the combustion chamber is at its smallest volume) is typically referred to by those of skill in the art as top dead center (TDC). Herein, the compression stroke top dead center is indicated as 0 degrees top dead center (0 TDC). In a process herein referred to as injection, fuel is introduced into the combustion chamber. In a process herein referred to as ignition, the injected fuel is ignited by known ignition means, such as a spark plug, resulting in combustion. During the expansion stroke, the expanding gases push the piston back to BDC. Herein, the expansion stroke (also referred to as power stroke) BDC is indicated as 180 degrees after top dead center (180 ATDC). The crankshaft converts this piston movement into a rotational torque of the rotary shaft. During the exhaust stroke, exhaust valves open to release the residual combusted air-fuel mixture to an exhaust passage and the piston returns to TDC.

Curve 604 depicts a valve timing, valve lift, and valve opening duration for a first intake valve (I1) coupled to an intake passage of the engine cylinder while curve 606 depicts a valve timing, valve lift, and duration of valve opening for a second intake valve (I2) coupled to the intake passage of the engine cylinder. Curve 608 depicts a valve timing, valve lift, and duration of valve opening for the first exhaust valve (blowdown valve) coupled to a first or second exhaust passage of the engine cylinder, while curve 610 depicts a valve timing, valve lift, and duration of valve opening for the second exhaust valve (scavenging valve) coupled to a third exhaust passage of the engine cylinder.

Curve 612 depicts an exhaust mass flow from the first exhaust valve to the turbine via the first or second exhaust passage. As an example, the peak of curve 612 may coincide with the peak of the first exhaust valve lift curve 608, while in an alternate example, the peak of the mass flow rate curve 612 may lag the first exhaust valve lift curve 608. Further, curve 614 depicts an exhaust mass flow from the second exhaust valve to an exhaust catalyst via the third exhaust passage. The peak of the scavenging mass flow rate curve 614 may lag or coincide with the peak of the second exhaust valve lift curve 610 depending on engine operating conditions.

As an example, the first intake valve (I1) and the second intake valve (I2) may be opened at a common valve timing, starting at or just before 360 degrees BTDC, and ending at or just after 180 degrees BTDC. Additionally, both the first and second intake valves may be opened with the same amount of lift and for the same duration. In other examples, the intake valve opening and/or closing timing may be staggered while the duration and lift of both intake valves may be the same.

Now turning to valve timing for the first exhaust valve. The first exhaust valve may be opened earlier in the engine cycle compared to the second exhaust. In other words, the first exhaust valve opening timing may be advanced relative to the second exhaust valve opening timing. Specifically, the first exhaust valve may be opened prior to 180 degrees ATDC, while the second exhaust valve may be opened at or just before 180 degrees ATDC. In this way, the first exhaust valve may be opened before the start of an exhaust stroke, just as the piston travels towards the BDC near the end of the power stroke, and may close before the exhaust stroke ends. In comparison, the second exhaust valve may be opened after the first exhaust valve is opened (e.g., at or just before the start of the exhaust stroke) and may remain open until the exhaust stroke ends or until a subsequent intake stroke has commenced. Additionally, the first exhaust valve may be opened with a first, lower amount of valve lift while the second exhaust valve may be opened with a second, higher amount of valve lift. While the depicted example illustrates different valve lift, valve timing and valve opening duration for the first and second exhaust valve of an engine cylinder, it will be appreciated that in alternate embodiments, the first and second exhaust valve may have the same amount of valve lift and/or same valve opening duration while opening at a staggered valve timing.

By opening the first exhaust valve prior to opening the second exhaust valve, a majority of the exhaust energy may be directed to the turbine. Further, by opening the second exhaust valve, excess exhaust energy may be directed to the exhaust catalyst to decrease the backpressure between the turbine inlet and the exhaust port, and reduce pumping penalty.

In one example, the first and second exhaust valves may be coupled to an exhaust valve actuator, the valve actuator may be adjusted to open the first exhaust valve at a first valve timing while opening the second exhaust valve at a second valve timing. The valve actuator may also be adjusted to enable the first exhaust valve to be opened with the first amount of valve lift for a first duration while opening the second exhaust valve with a second, different amount of valve lift for a second duration. In another example, a cam profile of the first exhaust valve may be adjusted to open and close the first exhaust valve to control flow of exhaust energy from an engine cylinder to the turbine. On the other hand, the cam profile of the second exhaust valve may be adjusted to open and close the second exhaust valve to control exhaust flow from the engine cylinder to the exhaust catalyst.

In this way, using different valve lift, valve timing and duration of valve opening for the first and second exhaust valve, allows for improved control of exhaust flow from the engine cylinder to the turbine and exhaust catalyst, improving engine efficiency and reducing engine emissions.

Referring to FIG. 7, an example operation is depicted where the first exhaust valve of cylinders of a first and second cylinder group of an engine are selectively deactivated to control exhaust mass flow to a turbine of a turbine-generator (e.g., turbine-generator 190 at FIG. 1A) included in an exhaust system of a split exhaust engine system, such as the engine system 10 at FIG. 1A. The sequence of FIG. 7 may be provided by executing instructions in the system of FIGS. 1A-2 according to the methods of FIGS. 3, 4, and 5. Vertical markers at times t0-t7 represent times of interest during the sequence. In all the plots discussed below, the X axis represents time and time increases from the left side of each plot to the right side of each plot.

The first plot from top of FIG. 7 depicts turbine speed versus time. The Y axis represents a turbine speed of the turbine-generator and the turbine speed increases in the direction of the Y axis arrow. Trace 702 represents an actual turbine speed, and horizontal line 704 represents a threshold turbine speed.

The second plot from top of FIG. 7 depicts generator (power or current) output versus time. The Y axis represents a generator output and the generator output increases in the direction of the Y axis arrow. Trace 706 represents an actual generator output, and trace 708 represents a threshold generator output.

The third plot from top of FIG. 7 depicts generator NVH (also referred to herein as generator vibration) versus time. The Y axis represents a generator NVH and the generator NVH increases in the direction of the Y axis arrow. Trace 710 represents an actual generator NVH, and trace 712 represents a threshold generator NVH.

The fourth plot from top of FIG. 7 depicts exhaust mass flow into a first or a second exhaust passage from the first exhaust valve of one or more cylinders of a first and second cylinder group versus time. The first exhaust passage receives exhaust from the first exhaust valve of all cylinders of the first cylinder group and provides exhaust to a first scroll of an exhaust turbine. The second exhaust passage receives exhaust from the first exhaust valve of all cylinders of the second cylinder group and provides exhaust to a second scroll of the exhaust turbine. Exhaust flows to an exhaust catalyst after passing through the turbine. The Y axis represents an exhaust mass flow through the first passage and the exhaust mass flow increases in the direction of the Y axis. Trace 714 represents the exhaust mass flow into the first passage (or the second passage) from the first exhaust valve of one or more cylinders of the first and second cylinder group.

The fifth plot from top of FIG. 7 depicts exhaust mass flow into a third passage from a second exhaust valve of all cylinders of the first and second cylinder group versus time. The third exhaust passage provides exhaust to an exhaust catalyst, while bypassing the turbine. The Y axis represents the exhaust mass flow and the exhaust mass flow increases in the direction of the Y axis. Trace 718 represents the exhaust mass flow into the third passage from the second exhaust valve of all cylinders of the first and second cylinder group.

The sixth plot from top of FIG. 7 depicts total exhaust mass flow through an exhaust catalyst versus time. As such, this represents exhaust flow received from each of the first, second, and third exhaust passages. The Y axis represents the total exhaust mass flow through the exhaust catalyst and the total exhaust mass flow increases in the direction of Y axis. Trace 720 represents the total exhaust mass flow through the exhaust catalyst.

The seventh plot from top of FIG. 7 depicts a deactivation condition (0, 1, and 2) for the first exhaust valve of one or more cylinders of the first cylinder group. A value "0" represents a condition when the first exhaust valve of all cylinders in the first and second cylinder group are active. A value "1" represents a condition where the first exhaust valve of a single cylinder in the first and second cylinder group are deactivated, while a value "2" represents a condition where the first exhaust valve of all cylinders of the first and second cylinder group are deactivated. The Y axis represents the deactivation condition of the first exhaust valve of one or more cylinders of the first and second cylinder group. Trace 722 represents a condition when the first exhaust valve of one or more cylinders of the first and second cylinder group are deactivated. The eighth plot from top of FIG. 7 depicts a waste-gate valve opening condition (0 and 1) versus time for a waste gate valve in a first and second exhaust passages. The value "0" represents a condition when the waste-gate valve of the first and second exhaust passage is closed, while a value "1" represents a condition when the waste-gate valve is open. The Y axis represents the waste-gate valve opening condition of the first and second exhaust passage. Trace 724 represents an opening condition of the waste-gate valve of the first and second exhaust passage.

Prior to t1, the engine may be operating with engine speed-load increasing, resulting in an increase in exhaust mass flow through the first, second, and third passages. Also, the engine may be operating with the waste gate valve closed, resulting in an increase in the turbine speed. Between t0 and t1, the turbine speed (702) may be increasing but may remain below the threshold speed (704). Due to the increase in turbine speed, there may also be a corresponding increase in generator output (706), however, the generator output (706) may remain below the threshold 708. In addition, the generator vibration (710) may remain below the threshold vibration (712). As a result, the engine may be operated with the first exhaust valve in all cylinders of the first and second cylinder group active.

Immediately before t1, the turbine speed (702) may exceed the threshold speed (704). During this first condition of turbine over-speed, the generation output and generator vibration is lower. An engine controller may deactivate a first cylinder pattern of individual first exhaust valve mechanisms of the first and second cylinder group (722) responsive to turbine speed higher than a threshold speed at t1. In the depicted example, the controller may select a first cylinder of the first cylinder group and a first cylinder of the second cylinder group, and the first exhaust valve of the selected cylinders may be deactivated. The first exhaust valve of the first cylinder of the first cylinder group and the first cylinder of the second cylinder group may be deactivated while the cylinders continue to be operated and with the intake valves and the second exhaust valve continuing to open and close over the engine cycle. In addition, the second cylinder of the first and second cylinder group may continue to operate with first and second exhaust valves active. As a result of the selective deactivation, exhaust mass flow through the first (or second) passage receiving exhaust from the first exhaust valve of the first cylinder of the first (or second) cylinder group may decrease (714). At the same time, exhaust flow through the third passage receiving exhaust from the second valve of the corresponding cylinders may increase (718) such that the total exhaust flow is maintained (720). Consequently, between t1 and t2, turbine speed may decrease due to deactivation of the first exhaust valve in the selected cylinders and the resulting drop in exhaust mass flow into the turbine. In addition, since the turbine drives the generator, by reducing the turbine speed, generator output may be maintained at desired levels and generator vibration may also be reduced.

At time t2, in response to the turbine speed (702) dropping to the threshold speed (704), the first exhaust valve of the first cylinder in the first cylinder group and the first cylinder in the second cylinder group may be reactivated (722).

Between t2 and t3, due to reactivation of the first exhaust valve of cylinders in the first and second cylinder group, exhaust flow from the first exhaust valve of all cylinders in the first and second cylinder group to the turbine may increase, resulting in an increase in the exhaust mass flow to the first passage and a corresponding decrease in the exhaust mass flow to the third passage while the total mass flow to a downstream catalyst remains constant.

At t3, the turbine speed once again exceeds the threshold speed. The rise in turbine speed at t3 is larger than the rise in turbine speed at t1. Further, the generator output may also rise due to the increase in turbine speed and may exceed the threshold output. In addition, the generator vibration may exceed the threshold vibration. During this second condition of turbine over-speed, the generation output and generator vibration is higher. Therefore, an engine controller may deactivate a second cylinder pattern of individual first exhaust valve mechanisms of the first and second cylinder group responsive to the turbine speed being higher than threshold speed and the generator output being higher than threshold levels. Alternatively, the engine controller may deactivate a third cylinder pattern of individual first exhaust valve mechanisms of the first and second cylinder group responsive to the turbine speed being higher than threshold speed and the generator vibration being higher than threshold vibration. As an example, the first exhaust valve of a second cylinder of the first cylinder group and a second cylinder of the second cylinder group may be deactivated (722). Specifically, between t3 and t4, the first exhaust valve of the second cylinder of the first cylinder group and the second cylinder of the second cylinder group may remain deactivated to reduce the exhaust flow to the twin scroll turbine. As a result of deactivation of the second cylinder of the first cylinder group and the second cylinder of the second cylinder group, the turbine speed, generator output and generator vibration may decrease between t3 and t4. In addition, exhaust mass flow through the first or second passage may decrease while the exhaust flow through the third passage (via the second exhaust valve of the corresponding cylinders) proportionally increases to maintain the total exhaust flow. Herein, the first cylinder pattern of deactivation at t1 and the second or third cylinder pattern of deactivation at t3 are responsive to distinct turbine over-speed conditions, however, in all cases the same number of cylinders, but of different identity, have their first exhaust valves selectively deactivated. In alternate examples, the second and third cylinder patterns may include the deactivation of first exhaust valves of a larger number of cylinders due to a larger difference between the turbine speed and the threshold speed.

At t4, the turbine speed may be decreasing but may still remain above the threshold speed while the generator out and generator vibration are above threshold levels. To expedite turbine speed control, generator output control and generation vibration control, a waste gate valve (724) coupled across the turbine may be opened to direct the exhaust flow to the exhaust catalyst, bypassing the turbine. Consequently, the exhaust flow to the turbine may decrease, reducing the turbine speed, generator output and generator vibration below corresponding thresholds at a faster rate as compared to the rate of decrease with only the first exhaust valves deactivated. At t5, the turbine speed may decrease below the threshold speed and the generator output and the generator vibration may decrease below the threshold levels. Therefore at t5, the first exhaust valve of the second cylinder of the first cylinder group and the second cylinder of the second cylinder group may be reactivated, and the waste gate valve may be closed.

Between t5 and t6, due to reactivation of the first exhaust valve of the second cylinder of the first cylinder group and the second cylinder of the second cylinder group, exhaust flow to the turbine via the first exhaust valve of all cylinders in the first and second cylinder group may increase while exhaust flow through the second valves correspondingly decreases.

At t6, the turbine speed may once again increase above the threshold speed, resulting in the generator output also exceeding the threshold output and the generator vibration exceeding than the threshold vibration. In order to reduce the turbine speed, generator output and the generator vibration, the first exhaust valve of all cylinders of the first and second cylinder group may be deactivated at t6 (722) resulting in a large drop in exhaust mass flow through the first or second passage and a larger increase in exhaust flow through the third passage. As a result of blowdown valve deactivation at t6, the turbine speed, generator output and the generator vibration may decrease between t6 and t7. Herein, due to a larger rise in turbine speed as compared to the turbine speed rise at t1 and t3, the first exhaust valve of all cylinders of the first and second cylinder group may remain deactivated for a longer duration to decrease flow of exhaust to the turbine to reduce turbine speed, generator output and generator vibration.

At t7, the turbine speed may decrease below the threshold speed, the generator output may decrease below the threshold output and the generator vibration may be below the threshold vibration. Therefore, the first exhaust valve in all cylinders of the first and second cylinder group may be reactivated. In other words, the engine may resume nominal operation with all valves active and with exhaust being delivered from each of a first exhaust valve and a second exhaust valve of each cylinder of a cylinder group. In particular, the nominal operation may include operating the first exhaust valve of each of the first cylinder and the second cylinder of a cylinder group with a first exhaust valve opening timing advanced with respect to a second exhaust valve opening timing of the second exhaust valve of each of the first cylinder and the second cylinder. Nominal operation may further include, operating the first exhaust valve of each cylinder of the first cylinder group and the second cylinder group with a first exhaust valve closing timing advanced with respect to a second exhaust valve closing timing of the second exhaust valve of each cylinder of the first cylinder group and the second cylinder group. In this way, by opening the second exhaust valve later during the exhaust cycle, cylinder pressure may be reduced from a higher backpressure upstream of the turbine inlet, to a lower pressure downstream of the turbine. Consequently pumping losses may be reduced.

In this way, improved engine operation may be realized by deactivating the first exhaust valve of one or more cylinders of the first and the second cylinder group when a difference between the turbine speed and the threshold speed is smaller or when the turbine speed exceeds the threshold speed for a shorter duration. By deactivating the first exhaust valve of each cylinder of the first and the second cylinder group when the difference between the turbine speed and the threshold speed is larger or when the turbine speed exceeds the threshold speed for a longer duration, turbine speed control can be improved, while also maintaining generator output at desired levels and reducing NVH issues associated with vibration at a generator driven by the turbine.

For example, an in-line engine may have four cylinders divided into cylinder groups, each cylinder group having two cylinders, each cylinder having a single first exhaust valve. Herein, when the difference between the turbine speed and the threshold turbine speed is higher than the first threshold, a single cylinder of the first cylinder group and a single cylinder of the second cylinder group may each be selected and the first exhaust valve of the selected cylinders may be deactivated. The single cylinder of the first cylinder group and the single cylinder of the second cylinder group may be selected based on their position along an engine clock and/or their firing order.

In another example, with a similar engine configuration, when the difference between the generator vibration and the threshold vibration is higher than the threshold difference, both cylinders of the first cylinder group and both cylinders of the second cylinder group may be selected and the first exhaust valve of all the selected cylinders may be deactivated. In this example, the first exhaust valve of all cylinders may be deactivated while the cylinders continue to be operated and with the intake valves and the second exhaust valve continuing to open and close over the engine cycle By deactivating the first exhaust valve of selected cylinders of the first and second cylinder group based on the turbine speed greater than the threshold turbine speed, generator output greater than the threshold output, generator vibration greater than the threshold vibration, turbine overspeed and elevation in generator vibration may be reduced while maintaining desired generator output, improving engine performance.

Referring now to FIG. 8, a graphic depicting an example operation of a first exhaust valve of one or more cylinders of a first and a second cylinder group to adjust flow of exhaust energy to a turbine of a turbine-generator (e.g., turbine-generator 190 at FIG. 1A) included in an exhaust system of a split exhaust engine system, such as the engine system 10 at FIG. 1A is shown. The sequence of FIG. 8 may be provided by executing instructions in the system of FIGS. 1A-2 according to the methods of FIGS. 3-5. Vertical markers at times t0-t8 represent time of interest during the sequence. In all the plots discussed below, the X axis represents time and time increases from the left side of each plot to the right side of each plot.

The first plot from top of FIG. 8 depicts engine load versus time. The Y axis represents an engine load and the engine load increases in the direction of the Y axis. Trace 802 represents an actual engine load, and horizontal line 804 represents a first threshold engine load while horizontal line 806 represents a second threshold engine load.

The second plot from top of FIG. 8 depicts deactivation condition (0 and 1) versus time of a first exhaust valve of a first and a second cylinder of a first cylinder group. The value "0" represents a condition when the first exhaust valve of the first cylinder and the second cylinder of the first cylinder group is not deactivated. The value "1" represents a condition when the first exhaust valve of a single cylinder of the first cylinder group is deactivated. The Y axis represents a deactivation condition when the first exhaust valve of a single cylinder of the first cylinder group is deactivated. Trace 808 represents a condition when the first exhaust valve of a single cylinder of the first cylinder group is deactivated.

The third plot from top of FIG. 8 depicts a deactivation condition (0 and 1) versus time of a first exhaust valve of a first and a second cylinder of a second cylinder group. The value "0" represents a condition when the first exhaust valve of the first cylinder and the second cylinder of the second cylinder group is not deactivated. The value "1" represents a condition when the first exhaust valve of a single cylinder of the second cylinder group is deactivated. The Y axis represents a deactivation condition when the first exhaust valve of a single cylinder of the second cylinder group is deactivated. Trace 810 represents a condition when the first exhaust valve of a single cylinder of the second cylinder group is deactivated.

The fourth plot from top of FIG. 8 depicts component temperature versus time. The Y axis represents a component temperature and the component temperature increases in the direction of the Y axis. Trace 812 represents the component temperature.

At time between t0 and t1, the engine may be operating with engine load (802) below a first threshold engine load (804). The component temperature (812) increases due to the increasing engine load, while remaining below a threshold component temperature (814). Therefore, deactivation of the first exhaust valve of any cylinder (of the first or the second cylinder group) to reduce component temperature is not required. As a result, the engine may be operated without blowdown valve deactivation.

At time t1, while the engine is operating below the first threshold engine load (804), the component temperature (812) may reach the threshold component temperature (814). Therefore, in order to reduce cylinder overheating, the first exhaust valve of the first cylinder in the first cylinder group may be deactivated at t1 (808) while the first exhaust valve of the second cylinder in the first cylinder group may remain active. Due to the deactivation of the first exhaust valve of the first cylinder in the first cylinder group, the component temperature starts to decrease, however remains above the threshold component temperature (814). In response to the elevated component temperature, and the concurrent rise in engine load above second threshold engine load 806 (which indicates a further propensity for cylinder heating), the first exhaust valve of the first cylinder of the second cylinder group is also deactivated at t2. In particular, the first exhaust valve of the first cylinder of the first and the second cylinder group may remain deactivated, while the first exhaust valve of the second cylinder of the first and the second cylinder group remain active. The first exhaust valve of the first cylinder of the first cylinder group and the first cylinder of the second cylinder group may be deactivated while the cylinders continue to be operated and with the intake valves and the second exhaust valve continuing to open and close over the engine cycle. As a result of the deactivation of the first exhaust valve of multiple cylinders, the component temperature starts to fall.

At t3, the engine load (802) decreases to the second threshold engine load (806) while the component temperature continues to remain above the threshold component temperature. In response to the drop in engine load, the first exhaust valve of the first cylinder of the second cylinder group (810) is reactivated at t3 while the first exhaust valve of the first cylinder of the first cylinder group (808) remains deactivated to reduce the component temperature.

Between t3 and t4, the engine load (802) drops to the first threshold engine load (804), and the component temperature drops to the threshold component temperature. Consequently, at t4, the first exhaust valve of the first cylinder of the first cylinder group (808) is reactivated.

Between t4 and t5, the engine load may decrease further to below the first threshold engine load and the component temperature may remain below the threshold component temperature. Consequently, the first exhaust valve of all cylinders of the first and the second cylinder group may remain active.

Next, at time t5, the engine load (802) may again increase to the first threshold engine load (804). As a result of the increase in engine load, the component temperature may also increase and exceed the threshold component temperature. In response to the cylinder heating, at t5, the first exhaust valve of the second cylinder of the second cylinder group (810) may be deactivated to reduce cylinder overheating. Between t5 and t6, the engine load (802) may continue to increase, exceeding the first threshold engine load (804) but remaining below the second threshold engine load (806) until just before t6. In response to the increase in engine load, the component temperature may also increase while remaining above the threshold component temperature. Therefore, in order to reduce further component temperature rise, the first exhaust valve of the second cylinder of the first cylinder group (808) may also be deactivated at t6.

Between t6 and t7, the engine load may increase. However, by maintaining the first exhaust valve of the second cylinder of the first and the second cylinder group deactivated, component temperature is reduced and overheating is averted.

At t7, in response to a drop in the component temperature, the first exhaust valve of the second cylinder of the first cylinder group (808) is reactivated. However, due to the engine load being above the first threshold engine load, the first exhaust valve of the second cylinder of the second cylinder group (810) may remain deactivated to further reduce component heating resulting from the elevated engine load.

At time t8, the first exhaust valve of the second cylinder of the second cylinder group (810) may be reactivated since the engine load has decreased below the first threshold engine load and the component temperature has decreased below the threshold component temperature. In other words, the engine may resume nominal operation without blowdown valve deactivation. In particular, nominal operation may include delivering exhaust from the first exhaust valve of each of the first cylinder and the second cylinder and operating the first exhaust valve of each of the first cylinder and the second cylinder with a first exhaust valve opening timing advanced with respect to a second exhaust valve opening timing of the second exhaust valve of each of the first cylinder and the second cylinder. Nominal operation may further include, delivering exhaust from the first exhaust valve and operating the first exhaust valve of each cylinder of the first cylinder group and the second cylinder group with a first exhaust valve closing timing advanced with respect to a second exhaust valve closing timing of the second exhaust valve of each cylinder of the first cylinder group and the second cylinder group.

In this way, by selectively deactivating an exhaust valve of one or more cylinders coupled to a passage directing exhaust to a turbine scroll, turbine speed may be controlled quickly. In particular, by adjusting the number and identity of cylinders of cylinder groups used for selective exhaust valve deactivation, the exhaust mass flow to a downstream turbine can be varied to provide a various range of flows. In addition, by selecting the cylinders based on their grouping, NVH issues resulting from turbine over-speeding can be reduced. For example, vibration experienced at a generator driven by the turbine can be reduced. By maintaining a remaining exhaust valve of the one or more cylinders active, the remaining exhaust valve coupled to a passage directing exhaust to an exhaust catalyst while bypassing the turbine, catalyst temperature control may be performed concurrent to the turbine speed control. In this way, turbine over speed, elevation in generation NVH and component over-temperature may be reduced to improve engine performance.

In one example, a method for an engine comprises: delivering exhaust from a first exhaust valve of all cylinders of a first cylinder group to a first scroll of an exhaust turbine while delivering exhaust from a first exhaust valve of all cylinders of a second cylinder group to a second scroll of the exhaust turbine; and delivering exhaust from a second exhaust valve of all cylinders of the first and second cylinder group to an exhaust catalyst, while bypassing the turbine. The preceding example may additionally or optionally further comprise, in response to turbine speed greater than a threshold speed, selectively deactivating the first exhaust valve of one or more cylinders of the first and second cylinder group. In any or all of the preceding examples, additionally or optionally, the turbine drives a generator. Any or all of the preceding examples may additionally or optionally further comprise selecting one or more of a number of first exhaust valves for deactivation, and a duration of the selectively deactivating based on the turbine speed. In any or all of the preceding examples, additionally or optionally, one or more of the number of first exhaust valves selected for deactivation, the sequence of the selectively deactivating, and the duration of the selectively deactivating is further selected based on generator power or current output relative to a threshold output or generator vibration relative to a threshold vibration.

In any or all of the preceding examples, additionally or optionally, one or more of the number of first exhaust valves selected for deactivation, the sequence of the selectively deactivating, and the duration of the selectively deactivating is further selected based on an exhaust system temperature relative to a threshold temperature. In any or all of the preceding examples, additionally or optionally, the first exhaust valve of all cylinders of the first cylinder group is coupled to the first scroll of the turbine via a first exhaust manifold and the first exhaust valve of all cylinders of the second cylinder group is coupled to the second scroll of the turbine via a second, different exhaust manifold, and wherein the second exhaust valve of all cylinders of the first and second cylinder group is coupled to the exhaust catalyst via a third exhaust manifold which bypasses the turbine. In any or all of the preceding examples, additionally or optionally, the first cylinder group is located on a first bank of the engine, and the second cylinder group is located on a second, different bank of the engine. In any or all of the preceding examples, additionally or optionally, the first cylinder group and the second cylinder group are selected based on cylinder position along an engine block and firing order.

Furthermore, in any or all of the preceding examples, additionally or optionally, the selecting based on the turbine speed includes deactivating the first exhaust valve of one cylinder of the first and the second cylinder group when a difference between the turbine speed and the threshold speed is smaller or when the turbine speed exceeds the threshold speed for a shorter duration; and deactivating the first exhaust valve of each cylinder of the first and the second cylinder group when the difference between the turbine speed and the threshold speed is larger or when the turbine speed exceeds the threshold speed for a longer duration. In any or all of the preceding examples, additionally or optionally, the selecting based on the exhaust system temperature further includes, in response to the exhaust system temperature being less than the threshold temperature, selectively deactivating the first exhaust valve of all cylinders of the first and second cylinder group. In any or all of the preceding examples, additionally or optionally, delivering exhaust from the first exhaust valve includes operating the first exhaust valve of each of the first cylinder and the second cylinder with a first exhaust valve opening timing advanced with respect to a second exhaust valve opening timing of the second exhaust valve of each of the first cylinder and the second cylinder. In any or all of the preceding examples, additionally or optionally, delivering exhaust from the first exhaust valve further includes operating the first exhaust valve of each cylinder of the first cylinder group and the second cylinder group with a first exhaust valve closing timing advanced with respect to a second exhaust valve closing timing of the second exhaust valve of each cylinder of the first cylinder group and the second cylinder group.

In another example, a method for an engine may comprise, flowing exhaust from a first exhaust valve of all cylinders of a first cylinder group to a first scroll of an exhaust turbine; flowing exhaust from a first exhaust valve of all cylinders of a second cylinder group to a second scroll of the exhaust turbine, the turbine driving a generator; flowing exhaust from a second exhaust valve of all cylinders of the first and second cylinder group to an exhaust catalyst while bypassing the turbine; and deactivating a first cylinder pattern of individual first exhaust valve mechanisms of the first and second cylinder group responsive to turbine speed higher than a threshold speed during a first operating condition; and deactivating a second, different, cylinder pattern of individual first exhaust valve mechanisms of the first and second cylinder group responsive to turbine speed higher than the threshold speed during a second operating condition different than and mutually exclusive from the first condition. The preceding example may additionally or optionally comprise, each of the first and second patterns based on one or more of turbine speed, engine speed, engine load, engine temperature, and transmission gear selection. In any or all of the preceding examples, additionally or optionally, the first cylinder pattern includes a first cylinder of the first cylinder group and a first cylinder of the second cylinder group and the second cylinder pattern includes a second cylinder of the first cylinder group and a second cylinder of the second cylinder group. In any or all of the preceding examples, additionally or optionally, deactivating the first cylinder pattern includes selectively deactivating individual first exhaust valve mechanisms of one or more cylinders of only the first cylinder group when the engine load is higher than a predetermined value, and selectively deactivating individual first exhaust valve mechanisms of one or more cylinders of both the first and the second cylinder group when the engine load is lower than the predetermined value. Any or all of the preceding examples may additionally or optionally further comprise, deactivating the second cylinder pattern includes selectively deactivating individual first exhaust valve mechanisms of one or more cylinders of only the first cylinder group when the engine speed is higher than a predetermined value, and selectively deactivating individual first exhaust valve mechanisms of one or more cylinders of both the first and the second cylinder group when the engine speed is lower than the predetermined value.

Another example engine system comprises: an engine including an exhaust manifold with an exhaust catalyst; an exhaust turbine with a first and a second scroll, the turbine driving a generator; a first cylinder group with a first cylinder, the first cylinder including a first and a second exhaust valve, the first exhaust valve selectively deactivatable; a second cylinder group with a second cylinder, the second cylinder including a first and a second exhaust valve, the first exhaust valve selectively deactivatable; a first passage coupling the first exhaust valve of the first cylinder to a first scroll of the turbine; a second passage coupling the first exhaust valve of the second cylinder to the second scroll of the turbine; a third passage coupling the second exhaust valve of each of the first and second cylinder to an exhaust catalyst, bypassing the turbine, the exhaust catalyst positioned downstream of the turbine; and a controller. The controller may be configured with computer readable instructions stored on non-transitory memory for: operating in a first mode with the first exhaust valve of the first and the second cylinder activated; operating in a second mode with the first exhaust valve of one of the first cylinder and the second cylinder deactivated; operating in a third mode with the first exhaust valve of each of the first and the second cylinder deactivated; and transitioning between modes based on one or more of exhaust system temperature, and turbine speed. In the preceding example, additionally or optionally, the transitioning includes transitioning from the first mode to the second mode in response to one or more of a smaller than threshold rise in exhaust system temperature, a smaller than threshold increase in turbine speed; and transitioning from the first mode to the third mode in response to one or more of a larger than threshold rise in exhaust system temperature, a larger than threshold increase in turbine speed, and wherein during each of the first, second, and third modes, the second exhaust valve is active.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   delivering exhaust from a first exhaust valve of all cylinders of a first cylinder group to a first scroll of an exhaust turbine while delivering exhaust from a first exhaust valve of all cylinders of a second cylinder group to a second scroll of the exhaust turbine; and
   delivering exhaust from a second exhaust valve of all cylinders of the first and second cylinder groups to an exhaust catalyst, while bypassing the exhaust turbine,
   wherein, in response to a turbine speed of the exhaust turbine being greater than a threshold speed, selectively deactivating at least one first exhaust valve of at least one cylinder selected from the first and the second cylinder groups.

2. The method of claim 1, wherein the exhaust turbine drives a generator.

3. The method of claim 1, wherein the selectively deactivating at least one first exhaust valve of at least one cylinder selected from the first and the second cylinder groups further comprises selecting a sequence of selectively deactivating the at least one first exhaust valve of at least one cylinder selected from the first and the second cylinder groups and a duration of the selectively deactivating the at least one first exhaust valve of at least one cylinder selected from the first and the second cylinder groups based on the turbine speed.

4. The method of claim 3, wherein the exhaust turbine drives a generator, and wherein the selectively deactivating at least one first exhaust valve of at least one cylinder selected from the first and the second cylinder groups for deactivation, the sequence of the selectively deactivating the at least one first exhaust valve of at least one cylinder selected from the first and the second cylinder groups, and the duration of the selectively deactivating at least one first exhaust valve of at least one cylinder selected from the first and the second cylinder groups is further based on generator power or current generator output relative to a threshold output.

5. The method of claim 3, wherein the selectively deactivating at least one first exhaust valve of at least one cylinder selected from the first and the second cylinder groups for deactivation, the sequence of the selectively deactivating the at least one first exhaust valve of at least one cylinder selected from the first and the second cylinder groups, and the duration of the selectively deactivating the at least one first exhaust valve of at least one cylinder selected from the first and the second cylinder groups is further selected based on an exhaust system temperature relative to a threshold temperature.

6. The method of claim 1, wherein the first exhaust valve of all cylinders of the first cylinder group is coupled to the first scroll of the exhaust turbine via a first exhaust manifold and the first exhaust valve of all cylinders of the second cylinder group is coupled to the second scroll of the exhaust turbine via a second, different exhaust manifold, and wherein the second exhaust valve of all cylinders of the first and second cylinder groups is coupled to the exhaust catalyst via a third exhaust manifold which bypasses the exhaust turbine.

7. The method of claim 1, wherein the at least one first exhaust valve of at least one cylinder selected from the first cylinder group or the second cylinder group is selected based on a cylinder position along an engine block and firing order.

8. The method of claim 1, wherein the selectively deactivating at least one first exhaust valve of at least one cylinder selected from the first and the second cylinder groups in response to the turbine speed greater than a threshold speed includes deactivating the first exhaust valve of one cylinder of the first and the second cylinder groups when a difference between the turbine speed and the threshold speed is larger than a first threshold value; and deactivating the first exhaust valve of each cylinder of the first and the second cylinder groups when the difference between the turbine speed and the threshold speed is larger than a second threshold value, wherein the second threshold value is larger than the first threshold value.

9. The method of claim 5, wherein selectively deactivating at least one first exhaust valve of at least one cylinder selected from the first and the second cylinder groups for deactivation, the sequence of the selectively deactivating at least one first exhaust valve of at least one cylinder selected from the first and the second cylinder groups, and the duration of the selectively deactivating at least one first exhaust valve of at least one cylinder selected from the first and the second cylinder groups based on the exhaust system temperature further includes, in response to the exhaust system temperature being less than the threshold temperature, selectively deactivating the first exhaust valve of all cylinders of the first and second cylinder groups.

10. The method of claim 1, wherein delivering exhaust from the first exhaust valve includes operating the first exhaust valve of each of the first cylinder and the second cylinder with a first exhaust valve opening timing advanced with respect to a second exhaust valve opening timing of the second exhaust valve of each of the first cylinder and the second cylinder.

11. The method of claim 1, wherein delivering exhaust from the first exhaust valve further includes operating the first exhaust valve of each cylinder of the first cylinder group and the second cylinder group with a first exhaust valve closing timing advanced with respect to a second exhaust valve closing timing of the second exhaust valve of each cylinder of the first cylinder group and the second cylinder group.

12. A method for an engine, comprising:
flowing exhaust from a first exhaust valve of all cylinders of a first cylinder group to a first scroll of an exhaust turbine;
flowing exhaust from a first exhaust valve of all cylinders of a second cylinder group to a second scroll of the exhaust turbine, the exhaust turbine driving a generator;
flowing exhaust from a second exhaust valve of all cylinders of the first and second cylinder groups to an exhaust catalyst while bypassing the exhaust turbine; and
deactivating a first cylinder pattern of individual first exhaust valve mechanisms of the first and second cylinder groups responsive to a turbine speed higher than a threshold speed during a first operating condition; and
deactivating a second, different, cylinder pattern of individual first exhaust valve mechanisms of the first and second cylinder groups responsive to turbine speed higher than the threshold speed during a second operating condition different than and mutually exclusive from the first condition.

13. The method of claim 12, wherein each of the first and second cylinder patterns is based on one or more of engine speed, engine load, engine temperature, and transmission gear selection.

14. The method of claim 12, wherein the first cylinder pattern includes a first cylinder of the first cylinder group and a first cylinder of the second cylinder group and the second cylinder pattern includes a second cylinder of the first cylinder group and a second cylinder of the second cylinder group.

15. The method of claim 13, wherein deactivating the first cylinder pattern includes:
selectively deactivating individual first exhaust valve mechanisms of one or more cylinders of only the first cylinder group when engine load is higher than a predetermined value, and selectively deactivating individual first exhaust valve mechanisms of one or more cylinders of both the first and the second cylinder groups when the engine load is lower than the predetermined value.

16. The method of claim 13, wherein deactivating the second cylinder pattern includes:
selectively deactivating individual first exhaust valve mechanisms of one or more cylinders of only the first cylinder group when engine speed is higher than a predetermined value, and selectively deactivating individual first exhaust valve mechanisms of one or more cylinders of both the first and the second cylinder groups when the engine speed is lower than the predetermined value.

17. An engine system comprising:
an engine including an exhaust manifold with an exhaust catalyst;
an exhaust turbine with a first and a second scroll, the exhaust turbine driving a generator;
a first cylinder group with a first cylinder, the first cylinder including a first and a second exhaust valve, the first exhaust valve selectively deactivatable;
a second cylinder group with a second cylinder, the second cylinder including a first and a second exhaust valve, the first exhaust valve selectively deactivatable;
a first passage coupling the first exhaust valve of the first cylinder to the first scroll of the exhaust turbine;
a second passage coupling the first exhaust valve of the second cylinder to the second scroll of the exhaust turbine;
a third passage coupling the second exhaust valve of each of the first and second cylinders to the exhaust catalyst, bypassing the exhaust turbine, the exhaust catalyst positioned downstream of the exhaust turbine; and
a controller with computer readable instructions stored on non-transitory memory for:
operating in a first mode with the first exhaust valve of the first and the second cylinders activated;
operating in a second mode with the first exhaust valve of the first cylinder activated and the first exhaust valve of the second cylinder deactivated;
operating in a third mode with the first exhaust valve of each of the first and the second cylinders deactivated; and
transitioning between modes based on one or more of exhaust system temperature and turbine speed.

18. The system of claim 17, wherein the transitioning includes transitioning from the first mode to the second mode in response to one or more of a smaller than threshold rise in exhaust system temperature, a smaller than threshold increase in turbine speed; and transitioning from the first mode to the third mode in response to one or more of a larger than threshold rise in exhaust system temperature, a larger than threshold increase in turbine speed, and wherein during each of the first, second, and third modes, the second exhaust valve is active.

* * * * *